United States Patent
Grcev et al.

(10) Patent No.: US 8,691,902 B2
(45) Date of Patent: Apr. 8, 2014

(54) FLAME RETARDANT POLYCARBONATE COMPOSITIONS, METHOD OF MANUFACTURE THEREOF, AND ARTICLES THEREFROM

(75) Inventors: Snezana Grcev, Bergen op Zoom (NL); Christiaan Henricus Johannes Koevoets, Roosendaal (NL); Christianus Johannes Jacobus Maas, Rilland (NL); Hendrik Cornelis Jacobus de Nooijer, Middelburg (NL); Srinivas Siripurapu, Evansville, IN (US); Karin Irene van de Wetering, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 143 days.

(21) Appl. No.: 12/744,852

(22) PCT Filed: Dec. 8, 2009

(86) PCT No.: PCT/US2009/067122
§ 371 (c)(1),
(2), (4) Date: Feb. 15, 2011

(87) PCT Pub. No.: WO2010/077644
PCT Pub. Date: Jul. 8, 2010

(65) Prior Publication Data
US 2011/0229704 A1    Sep. 22, 2011

Related U.S. Application Data

(60) Provisional application No. 61/120,647, filed on Dec. 8, 2008.

(51) Int. Cl.
*C08K 5/5419* (2006.01)
*C08K 3/34* (2006.01)

(52) U.S. Cl.
USPC ............ 524/261; 524/451; 524/535; 524/537

(58) Field of Classification Search
USPC .......................... 524/449, 451, 261, 535, 537
See application file for complete search history.

(56) References Cited

U.S. PATENT DOCUMENTS

| | | | |
|---|---|---|---|
| 4,467,057 A | 8/1984 | Dieck et al. | |
| 4,558,141 A | 12/1985 | Squire | |
| 4,692,488 A * | 9/1987 | Kress et al. ................... | 524/139 |
| 5,266,618 A | 11/1993 | Watanabe et al. | |
| 5,472,644 A | 12/1995 | Schubert | |
| 5,514,767 A * | 5/1996 | Sakashita et al. ............. | 528/198 |
| 6,319,432 B1 | 11/2001 | Harrod et al. | |
| 6,433,046 B1 | 8/2002 | Campbell et al. | |
| 6,518,340 B1 | 2/2003 | Fishburn et al. | |
| 6,635,698 B2 | 10/2003 | Goossens et al. | |
| 6,649,677 B2 | 11/2003 | Jaatinen et al. | |
| 6,716,902 B2 | 4/2004 | Fishburn et al. | |
| 6,727,301 B1 | 4/2004 | Eckel et al. | |
| 6,737,465 B2 * | 5/2004 | Seidel et al. ................... | 524/451 |
| 6,767,943 B1 | 7/2004 | Eckel et al. | |
| 6,872,789 B2 | 3/2005 | Brinkhuis et al. | |
| 7,232,854 B2 | 6/2007 | Ma et al. | |
| 7,256,230 B2 | 8/2007 | Fishburn et al. | |
| 7,682,698 B2 | 3/2010 | Schultes et al. | |
| 7,683,131 B2 | 3/2010 | Goldacker et al. | |
| 7,834,075 B2 | 11/2010 | Buchholz et al. | |
| 7,947,781 B2 | 5/2011 | Arndt et al. | |
| 2002/0137832 A1 | 9/2002 | Ogoe et al. | |
| 2003/0008964 A1 | 1/2003 | Seidel et al. | |
| 2003/0191250 A1 | 10/2003 | Seidel et al. | |
| 2004/0106731 A1 | 6/2004 | Seidel et al. | |
| 2004/0178383 A1 | 9/2004 | Kikuchi | |
| 2005/0250908 A1 * | 11/2005 | Briers et al. .................... | 525/199 |
| 2006/0004154 A1 | 1/2006 | DeRudder et al. | |
| 2006/0079614 A1 * | 4/2006 | Kikuchi ......................... | 524/115 |
| 2006/0142455 A1 | 6/2006 | Agarwal et al. | |
| 2006/0205848 A1 * | 9/2006 | Siripurapu et al. ........... | 524/115 |
| 2006/0247356 A1 | 11/2006 | Agarwal | |
| 2007/0225441 A1 | 9/2007 | Wenz | |
| 2007/0282045 A1 | 12/2007 | Volkers et al. | |
| 2008/0004373 A1 | 1/2008 | Volkers et al. | |
| 2010/0113660 A1 | 5/2010 | Tomoda et al. | |
| 2010/0331450 A1 | 12/2010 | Memde et al. | |
| 2011/0195222 A1 | 8/2011 | Nakagawa et al. | |

FOREIGN PATENT DOCUMENTS

| | | |
|---|---|---|
| EP | 1808462 B1 | 7/2007 |
| JP | 07228764 A | 8/1995 |
| JP | 2004027113 A | 1/2004 |
| JP | 2005154582 A | 6/2005 |
| JP | 2006045282 A | 2/2006 |
| JP | 2006335883 A | 12/2006 |
| JP | 2008094904 A | 4/2008 |
| WO | 03082965 A1 | 10/2003 |
| WO | 2005075568 A2 | 8/2005 |
| WO | 2006062833 A1 | 6/2006 |

OTHER PUBLICATIONS

Ibeh, C., et al., Mechanical and Flammability Resistance Properties of Extrusion Enhanced ABS/PC Nanocomposites, Annual Technical Conference—Society of Plastics Engineers (2005), 63rd, pp. 1893-1897.
NF X 10-702-1, Smoke density test, Nov. 1995, 34 pages (French).
International Standard: ISO 6603-2, "Plastics—Determination of puncture impact behaviour of rigid plastic", (2000) 28 pages.

* cited by examiner

*Primary Examiner* — Vickey Nerangis
(74) *Attorney, Agent, or Firm* — Cantor Colburn LLP

(57) ABSTRACT

A thermoplastic polycarbonate composition includes, based on the total weight of the thermoplastic polycarbonate composition: 15 to less than 40 wt. % of a reinforcing mineral filler; and greater than 60 to 85 wt. % of a polymer component, including, based on the weight of the polymer component, 68 to 99.9 wt. % of an aromatic polycarbonate, 0.1 to 2 wt. % of a fluorinated polymer, optionally, 0.1 to 25 wt. % of an impact modifier; and optionally, 0.1 to 5 wt. % of an additive composition including an antioxidant, a mold release agent, and a stabilizer; wherein a molded sample of the thermoplastic polycarbonate composition has no drips when measured in accordance with NF P 92-505 at a thickness of 3.0 mm.

25 Claims, No Drawings

FLAME RETARDANT POLYCARBONATE COMPOSITIONS, METHOD OF MANUFACTURE THEREOF, AND ARTICLES THEREFROM

CROSS REFERENCE TO RELATED APPLICATIONS

The present application is a National Stage filing under 371 of PCT Application No. PCTUS0967122, filed Dec. 8, 2009, which claims priority to U.S. Provisional Patent Application No. 61/120,647 filed Dec. 8, 2008, both of which are hereby incorporated by reference in its entirety.

FIELD OF THE INVENTION

The present invention is directed to polycarbonate compositions, and in particular, to flame retardant polycarbonate compositions, methods of manufacture of the compositions, articles containing the composition, and methods of manufacture of the articles.

BACKGROUND OF THE INVENTION

Polycarbonates are useful in the manufacture of articles and components for a wide range of applications, from automotive parts to electronic appliances. Because of their broad use, it is beneficial to provide polycarbonate compositions with very good flame retardance. It is further beneficial, particularly in building and transportation applications, to provide polycarbonate compositions that produce very low smoke when ignited, with low toxicity.

While numerous flame retardant and/or low smoke polycarbonate compositions are known, there remains a need in the art for compositions that meet the most stringent of the flame retardance and low smoke standards. One difficulty in meeting these standards is that use of one component to improve flame retardance can concomitantly degrade another selected property, such as smoke density. It is particularly difficult to meet these standards while also maintaining good mechanical properties. Among the more stringent standards is the French NF F 16-101 (October 1988). It is very difficult for thicker (greater than 2 mm) thermoplastic materials to achieve an M1/F1 rating in accordance with this standard. In order to obtain M1/F1 rating, a sample must pass three different tests: the "drip test" determined in accordance with NF P 92-505; the "epiradiateur" test determined in accordance with NF P 92-501, and the "F test," consisting of the smoke density test determined in accordance with NF X 10-702 and the smoke toxicity test determined in accordance with NF X 70-100. It is particularly difficult to obtain an M1/F1 rating for the same composition at a range of thicknesses, as thinner sheets can more readily pass the flammability tests, but not the smoke density tests, and vice versa.

Particularly for polycarbonate compositions, dripping is a major cause for failing the M1 rating. Polytetrafluoroethylene (PTFE), which is used to prevent dripping in Underwriter Laboratories (UL) tests, does not prevent drip dripping in the tests conducted in accordance with NF P 92-505. Addition of mineral fillers such as $TiO_2$, talc, or clay to polycarbonate compositions can be effective to prevent drip in the UL tests. However, the effect is apparent only at lower levels of filler (less than 15 weight percent (wt. %)). Further, clay is often found to be more effective than talc in UL tests.

There accordingly remains a need in the art for polycarbonate compositions that meet stringent standards for flame retardance, in particular reduced dripping in accordance with NF P 92-505. There also remains a need in the art for polycarbonate compositions that meet stringent standards for flame retardance, reduced smoke density, and, beneficially, reduced toxicity. It would still further be an advantage if the polycarbonate compositions could be formulated without having a detrimental effect on mechanical properties.

SUMMARY OF THE INVENTION

The above described and other deficiencies of the art are met by a thermoplastic polycarbonate composition including, based on the total weight of the thermoplastic polycarbonate composition: (a) 15 to less than 40 wt. % of a reinforcing mineral filler; and (b) greater than 60 to 85 wt. % of a polymer component, having, based on the weight of the polymer component, 68 to 99.9 wt. % of an aromatic polycarbonate, 0.1 to 2 wt. % of a fluorinated polymer, optionally, 0.1 to 25 wt. % of an impact modifier; and optionally, 0.1 to 5 wt. % of an additive composition including an antioxidant, a mold release agent, and a stabilizer; wherein a molded sample of the thermoplastic polycarbonate composition has no drips when measured in accordance with NF P 92-505 at a thickness of 3.0 mm.

In one embodiment, a thermoplastic polycarbonate composition includes, based on the total weight of the thermoplastic polycarbonate composition: greater than 10 to less than 40 wt. % of a reinforcing mineral filler, wherein less than 20 wt. % of clay is present in the composition; and greater than 60 to less than 90 wt. % of a polymer component, having, based on the weight of the polymer component, 68 to 99.9 wt. % of an aromatic polycarbonate, 0.1 to 2 wt. % of a fluorinated polymer, optionally, 0.1 to 25 wt. % of an impact modifier; and optionally, 0.1 to 5 wt. % of an additive composition including an antioxidant, a mold release agent, and a stabilizer; wherein a molded sample of the thermoplastic polycarbonate composition has no drips when measured in accordance with NF P 92-505 at a thickness of 1.5 mm, and a smoke density index of less than 10, determined in accordance with the formula:

$$SDI=(Ds\ max/100)+(VOF4/30)$$

wherein
  SDI is the smoke density index;
  Ds max is the maximum smoke density; and
  VOF4 is the average smoke density measured over the first four minutes, and is calculated in accordance with the formula:

$$\tfrac{1}{2}Ds0+Ds1+Ds2+Ds3+\tfrac{1}{2}Ds4;$$

wherein
  Ds0 is the smoke density at 0 minutes,
  Ds1 is the smoke density at 1 minute,
  Ds2 is the smoke density at 2 minutes,
  Ds3 is the smoke density at 3 minutes, and
  Ds4 is the smoke density at 4 minutes; and
  Ds max, Ds0, Ds1, Ds2, Ds3, and Ds4 are measured in accordance with NF X 10-702 at a thickness of 3 mm.

In another embodiment, a method of manufacture includes the steps of blending the above-described components to form a thermoplastic polycarbonate composition. Altruistic In yet another embodiment, an article including the above-described thermoplastic polycarbonate composition.

In still another embodiment, a method of manufacture of an article includes the steps of molding, extruding, or shaping the above-described thermoplastic polycarbonate composition into an article.

In another specific embodiment, a sheet includes: a thermoplastic polycarbonate composition including, based on the total weight of the thermoplastic polycarbonate composition: (a) greater than 10 to less than 40 wt. % of a reinforcing mineral filler; (b) greater than 60 to less than 90 wt. % of a polymer component, having, based on the weight of the polymer component, 68 to 99.7 wt. % of an aromatic polycarbonate, 0.3 to 2 wt. % of a fluorinated polymer including a polytetrafluoroethylene associated with a thermoplastic, fluorinated polymers having a fluorinated backbone, optionally, 0.1 to 25 wt. % of an impact modifier; and optionally, 0.1 to 5 wt. % of an additive composition including an antioxidant, a mold release agent, and a stabilizer; wherein the sheet has no drips when measure in accordance with NF P 92-505 at a thickness of 1.5 mm, a smoke density index of less than 10 determined in accordance with the formula:

$$SDI=(Ds\ max/100)+(VOF4/30)$$

wherein

SDI is the smoke density index;

Ds max is the maximum smoke density; and

VOF4 is the average smoke density measured over the first four minutes, and is calculated in accordance with the formula:

$$\tfrac{1}{2}Ds0+Ds1+Ds2+Ds3+\tfrac{1}{2}Ds4;$$

wherein

Ds0 is the smoke density at 0 minutes,

Ds1 is the smoke density at 1 minute,

Ds2 is the smoke density at 2 minutes,

Ds3 is the smoke density at 3 minutes, and

Ds4 is the smoke density at 4 minutes; and

Ds max, Ds0, Ds1, Ds2, Ds3, and Ds4 are measured in accordance with NF X 10-702 at a thickness of 3 mm, and an M1 rating and an F1 rating at a sheet thickness of 4 mm.

The above described and other features are illustrated by the detailed description.

DETAILED DESCRIPTION OF THE INVENTION

The present invention is more particularly described in the following description and example that are intended to be illustrative only since numerous modifications and variations therein will be apparent to those skilled in the art. As used in the specification and in the claims, the term "comprising" may include the embodiments "consisting of" and "consisting essentially of" All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention is directed to flame retardant, low (or no drip) thermoplastic polycarbonate compositions that may be obtained using a specific combination of components, in particular 15 to less than 40 wt. % of a reinforcing mineral filler, and greater than 60 to 85 wt. % of a polymer component including a polycarbonate and a fluorinated polymer. In an alternative embodiment, the present invention is directed to flame retardant, low drip and low smoke density thermoplastic polycarbonate compositions that may be obtained using a specific combination of components, in particular greater than 10 to less than 40 wt. % of a reinforcing mineral filler, and greater than 60 to less than 90 wt. % of a polymer component including a polycarbonate and a fluorinated polymer. It has been found that the use of higher quantities of a reinforcing mineral filler in combination with the polymer component unexpectedly enables these compositions to have a combination of no drips when measured in accordance with NF P 92-505, and, in some formulations, a low smoke density index. This result is particularly surprising because known anti-drip agents, such as PTFE, are not effective or even induce dripping in this test. Further, non-reinforcing fillers such as $TiO_2$ do not reduce dripping. In some embodiments, the compositions can be formulated to achieve an M1/F1 rating. In other embodiments, the compositions can further have improved physical properties beneficial for the manufacture of sheets used in construction and transportation applications, in particular good processability, a good balance between impact strength and stiffness, and/or chemical resistance to solvents, fuels, and cleaners. Use of specific impact modifiers can provide ductility, without adversely affecting the advantageous flame retardance of the compositions, in particular low drip. In other embodiments, use of specific impact modifiers can provide ductility, without adversely affecting the advantageous flame retardance of the compositions, in particular low drip, low smoke density, and low toxicity of the compositions.

As stated above, in order to obtain the selected properties, the thermoplastic polycarbonate compositions in one embodiment include 15 to less than 40 wt. % of a reinforcing mineral filler, and greater than 60 to 85 wt. % of a polymer component and in another embodiment, include greater than 10 to less than 40 wt. % of a reinforcing mineral filler, and greater than 60 to less than 90 wt. % of a polymer component. The polymer component contains a polycarbonate, a fluorinated polymer, and an optional impact modifier.

As used herein, the term "polycarbonate" means compositions having repeating structural carbonate units of formula (1)

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (3)

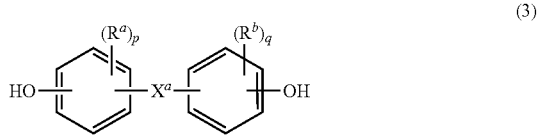

wherein $R^a$ and $R^b$ are each independently a halogen or $C_{1-12}$ alkyl; p and q are each independently integers of 0 to 4; and $X^a$ is a single bond or a bridging group connecting the two hydroxy-substituted aromatic groups, where the single bond or bridging group and the hydroxy substituent of each $C_6$ arylene group are disposed ortho, meta, or para (specifically para) to each other on the $C_6$ arylene group. In an embodiment, the $X^a$ is single bond, or the bridging groups —O—, —S—, —S(O)—, —S(O)$_2$—, —C(O)—, or a $C_{1-18}$ organic group. The $C_{1-18}$ organic group can be cyclic or acyclic, aromatic or non-aromatic, and can further include heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q are each 1, and $R^a$ and $R^b$ are each a $C_{1-3}$ alkyl group, specifically methyl, disposed meta to the hydroxy group on each arylene group. In another embodiment, p and q are each 0.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ hetero alkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include, but are not limited to, methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein Xa is a substituted cycloalkylidene is the cyclohexylidene-bridged, alkyl-substituted bisphenol of formula (4)

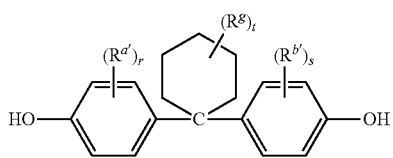

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ can, when including an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (5)

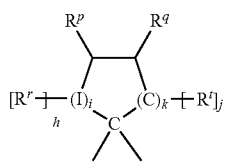

(5)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include compounds of formula (6)

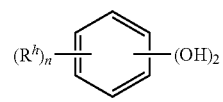

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include, but are not limited to, the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations including at least one of the foregoing dihydroxy compounds.

Specific examples of bisphenol compounds of formula (3) include, but are not limited to, 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-2-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations including at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In one embodiment, the polycarbonate has flow properties useful for the manufacture of thin articles. Melt volume flow rate (often abbreviated MVR) measures the rate of extrusion of a thermoplastics through an orifice at a prescribed temperature and load. Polycarbonates useful for the formation of thin articles can have an MVR, measured at 260° C./5 kg, of 5 to 20 cubic centimeters per 10 minutes (cc/10 min), specifically 8 to 15 cc/10 min. Combinations of polycarbonates of different flow properties can be used to achieve the overall selected flow property.

"Polycarbonates" as used herein further include homopolycarbonates, (wherein each $R^1$ in the polymer is the same), copolymers including different $R^1$ moieties in the carbonate (referred to herein as "copolycarbonates"), copolymers including carbonate units and other types of polymer units, such as ester units, and combinations including at least one of homopolycarbonates and/or copolycarbonates. As used herein, a "combination" is inclusive of blends, mixtures, alloys, reaction products, and the like. In one embodiment, only polycarbonate units are present.

Polycarbonates can be manufactured by processes such as interfacial polymerization and melt polymerization. Although the reaction conditions for interfacial polymerization can vary, an exemplary process generally involves dissolving or dispersing the dihydroxy aromatic compound in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include, but are not limited to, methylene chloride, 1,2-dichloroethane, chlorobenzene, toluene, and the like. Exemplary carbonate precursors include, but are not limited to, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations including at least one of the foregoing types of carbonate precursors can also be used. In an exemplary embodiment, an interfacial polymerization reaction to form carbonate linkages uses phosgene as a carbonate precursor, and is referred to as a phosgenation reaction. Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, but are not limited to, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl)carboxylate, or a combination including at least one of the foregoing esters. In addition, useful transesterification catalysts can include phase transfer catalysts of formula $(R^3)_4Q^+X$, wherein each $R^3$, Q, and X are as defined above. Exemplary transesterification catalysts include, but are not limited to, tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination including at least one of the foregoing.

All types of polycarbonate end groups are contemplated, as being useful in the polycarbonates composition, provided that such end groups do not significantly adversely affect selected properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include, but are not limited to, trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of 0.05 to 2.0 wt. %. Mixtures including linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include, but are not limited to, certain mono-phenolic compounds (e.g., $C_1$-$C_{22}$ alkyl-substituted phenols such as p-cumyl-phenol, resorcinol monobenzoate, and p- and tertiary-butyl phenol), mono-carboxylic acid chlorides (e.g., benzoyl chloride, $C_1$-$C_{22}$ alkyl-substituted benzoyl chloride, toluoyl chloride, bromobenzoyl chloride, cinnamoyl chloride, and 4-nadimidobenzoyl chloride), and/or mono-chloroformates (e.g., phenyl chloroformate, alkyl-substituted phenyl chloroformate, p-cumyl phenyl chloroformate, toluene chloroformate). Combinations of different chain stoppers can be used.

The polymer component further includes a fluoropolymer composition. "Fluoropolymers" as used herein include homopolymers and copolymers that include repeating units derived from a fluorinated alpha-olefin monomer, i.e., an alpha-olefin monomer that includes at least one fluorine atom substituent, and optionally, a non-fluorinated, ethylenically unsaturated monomer reactive with the fluorinated alpha-olefin monomer. Exemplary alpha-olefin monomers include, but are not limited to, $CF_2$=$CF_2$, $CHF$=$CF_2$, $CH_2$=$CF_2$, $CH_2$=$CHF$, $CClF$=$CF_2$, $CCl_2$=$CF_2$, $CClF$=$CClF$, $CHF$=$CCl_2$, $CH_2$=$CClF$, and $CCl_2$=$CClF$, $CF_3CF$=$CF_2$, $CF_3CF$=$CHF$, $CF_3CH$=$CF_2$, $CF_3CH$=$CH_2$, $CF_3CF$=$CHF$, $CHF_2CH$=$CHF$, and $CF_3CH$=$CH_2$. Specifically, the fluorinated alpha-olefin monomer is one or more of tetrafluoroethylene ($CF_2$=$CF_2$), chlorotrifluoroethylene ($CClF$=$CF_2$), vinylidene fluoride ($CH_2$=$CF_2$), and hexafluoropropylene ($CF_2$=$CFCF_3$). Exemplary non-fluorinated monoethylenically unsaturated monomers include, but are not limited to, ethylene, propylene, butene, (meth)acrylate monomers such as methyl methacrylate and butyl acrylate, ethylenically unsaturated aromatic monomers such as styrene, vinyl ethers such as cyclohexyl vinyl ether, ethyl vinyl ether, and n-butyl vinyl ether, and vinyl esters such as vinyl acetate and vinyl versatate. Exemplary fluoropolymers include, but are not limited to, poly(tetrafluoroethylene) homopolymer (PTFE), poly(hexafluoroethylene), poly(tetrafluoroethylene-hexafluoroethylene), and poly(tetrafluoroethylene-ethylene-propylene). A specific exemplary fluoropolymer is PTFE, which can be fibril forming or non-fibril forming.

The fluoropolymer can be associated with, e.g., encapsulated by, another copolymer, for example a copolymer including units derived from the non-fluorinated ethylenically unsaturated monomers above and others. In one embodiment, the copolymer is a rigid copolymer such as styrene-acrylonitrile copolymer (SAN). PTFE encapsulated in SAN is known as TSAN. An exemplary TSAN includes 25 to 75 wt. %, specifically 50 wt. % PTFE and 25 to 75 wt. %, specifically 50 wt. % SAN, based on the total weight of the encapsulated fluoropolymer. The SAN can include, for example, 75 wt. % styrene and 25 wt. % acrylonitrile based on the total weight of the copolymer.

Another exemplary fluoropolymer is a fluoropolymer composition including 40 to 90 wt % of a fibrillating fluoropolymer, specifically PTFE, and 10 to 60 wt. % of a thermoplastic, fluorinated polymer having a fluorinated backbone and a ratio of fluorine atoms to carbon atoms in the backbone of at least 1:1, specifically at least 1.5:1. Such compositions are described in US Publication 2005/0250908. The fibrillating fluoropolymer can be a homopolymer of tetrafluoroethylene or a copolymer thereof, for example a copolymer with another fluorinated comonomer such as chlorotrifluoroethylene, a perfluorinated vinyl ether such as perfluoromethyl vinyl ether, or a perfluorinated olefin such as hexafluoropropylene. Generally, the amount of the optional comonomers is not more than 1% so that the fluoropolymer conforms to the ISO 12086 standard defining non-melt processable PTFE. The fibrillating PTFE typically has an average particle size (number average) of not more than 10 micrometers, specifically 50 nm to 5 micrometers, for example between 100 nm and 1 micrometer. The fibrillating PTFE can be produced via aqueous emulsion polymerization.

The thermoplastic, fluorinated polymers having a fluorinated backbone include, but are not limited to, fluoropolymers that include, but are not limited to, copolymerized units derived from a fluorinated, ethylenically unsaturated monomer of the formula $R^gCF$=$CR^g_2$, wherein each $R^g$ is independently H, F, Cl, $C_{1-8}$ alkyl, $C_{6-8}$ aryl, $C_{3-10}$ cycloalkyl, or $C_{1-8}$ perfluoroalkyl. In some embodiments, two or more monomers of the formula $R^gCF$=$CRg_2$ are used. In one embodiment, each $R^g$ is independently $C_{1-3}$ alkyl. Representative examples of these fluorinated, ethylenically unsaturated monomers include, but are not limited to, vinylidene fluoride, tetrafluoroethylene, hexafluoropropylene, chlorotrifluoroethylene, 2-chloropentafluoropropene, dichlorodifluoroethylene, 1,1-dichlorofluoroethylene, and combinations including at least one of the foregoing fluorinated monomers. Perfluoro-1,3-dioxoles can also be used, as described in U.S. Pat. No. 4,558,141. These fluorinated, ethylenically unsaturated monomer(s) can be copolymerized with a nonfluorinated, ethylenically unsaturated comonomer of the formula $R^h_2C$=$CR^h_2$ wherein each $R^h$ is independently H, Cl, or a $C_{1-8}$ alkyl, a $C_{1-10}$ cycloalkyl, or $C_{6-8}$ aryl. In one embodiment, $R^h$ is a $C_{1-3}$ alkyl. Representative examples of nonfluorinated, ethylenically unsaturated comonomers include, but are not limited to, ethylene, propylene, and the like. Particular examples of thermoplastic, fluorinated polymers having a fluorinated backbone include, but are not limited to, polyvinylidene fluoride; fluoropolymers derived from the copolymerization of two or more different fluorinated monomers of the formula $R^gCF$=$CR^g_2$; and fluoropolymers derived from one or more fluorinated monomers of the formula $R^gCF$=$CR^g_2$ and one or more nonfluorinated monomers of the formula $R^h_2C$=$CR^h_2$, e.g., a terpolymer derived from one or more fluorinated monomers of the formula $R^gCF$=$CR^g_2$ and one or more nonfluorinated monomers of the formula $R^h_2C$=$CR^h_2$, specifically a terpolymer derived from two fluorinated monomers of the formula $R^gCF$=$CR^g_2$ and one nonfluorinated monomer of the formula $R^h_2C$=$CR^h_2$. Specific exemplary thermoplastic, fluorinated polymers having a fluorinated backbone are derived from vinylidene fluoride and hexafluoropropylene; tetrafluoroethylene and at least 5 wt. % of hexafluoropropylene or a combination of hexafluoropropylene and vinylidene fluoride; or tetrafluoroethylene, hexafluoropropylene, and a nonfluorinated monomer of the formula $R^h_2C$=$CR^h_2$. The amount of thermoplastic, fluorinated polymers having a fluorinated backbone can be 10 to 60 wt. %, specifically 12 to 50 wt. %, more specifically 15 to 30 wt. %, based on the on the total weight of the thermoplastic, fluorinated polymers having a fluorinated backbone and the fibrillating fluoropolymer.

One fluoropolymer composition that can be used in the instant compositions is commercially available from 3M under the trade name 3M Dyneon® MM 5935EF, and is particularly effective for formulating compositions that can attain a combination of good flame retardance, low smoke density, and low smoke toxicity in samples having a range of thicknesses, for example from 1 mm to 6 mm In one embodiment, use of fluoropolymer compositions of this type allows compositions as described herein to attain an M1/F1 rating at thicknesses from 1 mm to 4 mm.

Optionally, the polymer component can further include an impact modifier. Exemplary impact modifiers include, but are not limited to, natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, silicone oils, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), SAN, acrylonitrile-ethylene-propylene-diene-styrene (AES), styrene-isoprene-styrene (SIS), methyl methacrylate-butadiene-styrene (MBS), high rubber graft (HRG) ABS, and the like.

It has been found that use of certain impact modifiers adversely affects passing the most stringent flame, smoke, and/or toxicity standards. Selection of the appropriate impact modifier is therefore important in achieving the optimum combination of flame retardance, low smoke density, low smoke toxicity, and good mechanical properties.

In a specific embodiment, the impact modifier is MBS or ABS, in particular bulk polymerized ABS. As is known in the art, ABS is a two-phase thermoplastic with SAN copolymer constituting the continuous phase (matrix). Additional SAN, or "free SAN" can further be added to various compositions as, for example, a flow modifier. "Free SAN" is to be distinguished from the matrix SAN present in the ABS that arises from the manufacture of the ABS. In one embodiment, the composition contains less than 6 wt. %, specifically less than 3 wt. % of free SAN, more specifically 0 wt. % of free SAN, based on the total weight of the composition.

In another embodiment, the impact modifier includes less than 5 wt. %, specifically less than 2 wt. % of units derived from butadiene, based on the total weight of the impact modifier. The presence of higher amounts of butadiene can, in some compositions, increase smoke density.

In another embodiment, the impact modifier is an organopolysiloxane including siloxane units of formula (7)

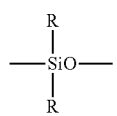

(7)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ arylalkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof Combinations of the foregoing R groups can be used in the same polymer.

In one embodiment, the impact modifier is a silicone oil, that is, an organopolysiloxane such as octamethylcyclotetrasiloxane, decamethylcyclopentasiloxane, polydimethylsiloxane, or polyphenylmethylsiloxane. Silicone oils are generally free of unsaturated groups, in particular ethylenically unsaturated groups. The silicone oils are fluid at 25° C. Exemplary silicone oils have a viscosity of 1 to 5,000 centistokes, specifically 100 to 2,500 centistokes, more specifically 500 to 1,500 centistokes, all at 25° C.

In another embodiment, the organopolysiloxane is a polycarbonate-polysiloxane copolymer, also referred to as a polycarbonate-polysiloxane. Polycarbonate-polysiloxanes include blocks of carbonate repeat units of formula (1) in combination with blocks of siloxane repeat units of formula (7).

The number of siloxane repeat units in the blocks can vary widely depending on the type and relative amount of each component in the thermoplastic polycarbonate composition, the selected properties of the composition, and like considerations. Generally, the number of repeat units in the siloxane blocks has an average value of 2 to 1,000, specifically 2 to 500, more specifically 5 to 100. In one embodiment, the number of repeat units in the siloxane blocks has an average value of 10 to 75, and in still another embodiment, the number of repeat units in the siloxane blocks has an average value of 20 to 60, more specifically 25 to 35 or 40 to 50. Where the number of repeat units in the siloxane blocks is of a lower value, e.g., less than 40, it can be beneficial to use a relatively larger amount of the polycarbonate-polysiloxane. Conversely, where the number of repeat units in the siloxane blocks is of a higher value, e.g., greater than 40, a relatively lower amount of the polycarbonate-polysiloxane copolymer can be used.

In one embodiment, the siloxane blocks are of formula (8)

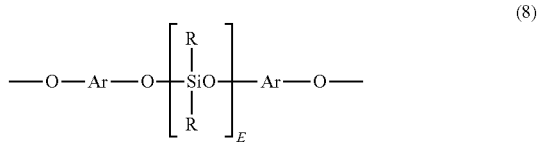

(8)

wherein E is the number of repeat units in the siloxane blocks as defined above; each R can be the same or different, and is as defined above; and Ar can be the same or different, and is a substituted or unsubstituted $C_6$-$C_{30}$ arylene group, wherein the bonds are directly connected to an aromatic moiety. The Ar groups in formula (8) can be derived from a $C_6$-$C_{30}$ dihydroxyarylene compound, for example a dihydroxy compound of formula (3) or (6) above. Exemplary dihydroxy compounds of formula (3) are 1,1-bis(4-hydroxyphenyl) methane, 1,1-bis(4-hydroxyphenyl) ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl) propane. Combinations including at least one of the foregoing dihydroxy compounds can also be used.

In another embodiment, the siloxane blocks are of formula (9)

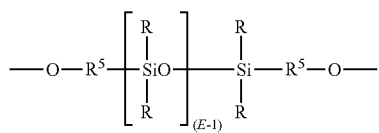

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the siloxane blocks are of formula (10):

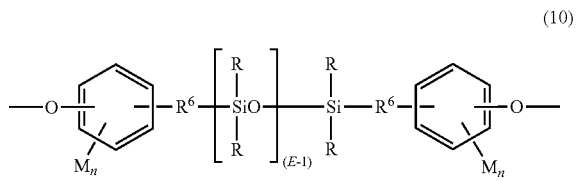

wherein R and E are as defined above. $R^6$ in formula (10) is a divalent $C_2$-$C_8$ aliphatic group. Each M in formula (10) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^6$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^6$ is a divalent $C_1$-$C_3$ aliphatic group, and R is methyl.

Blocks of formula (10) can be derived from the corresponding dihydroxy polysiloxane. Such dihydroxy polysiloxanes can be made by effecting a platinum-catalyzed addition between a siloxane hydride and an aliphatically unsaturated monohydric phenol. Exemplary aliphatically unsaturated monohydric phenols include, but are not limited to, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations including at least one of the foregoing can also be used.

The polycarbonate-polysiloxane can include 50 to 99 wt. % of carbonate units and 1 to 50 wt. % siloxane units. Within this range, the polycarbonate-polysiloxane can include 70 to 98 wt. %, more specifically 75 to 97 wt. % of carbonate units and 2 to 30 wt. %, more specifically 3 to 25 wt. % siloxane units.

Polycarbonate-polysiloxanes can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polycarbonate-polysiloxane can have a melt volume flow rate, measured at 300° C./1.2 kg, of 1 to 50 cubic centimeters per 10 minutes (cc/10 min), specifically 2 to 30 cc/10 min. Mixtures of polycarbonate-polyorganosiloxanes of different flow properties can be used to achieve the overall selected flow property.

One or more flame retardants can optionally be present in the thermoplastic polycarbonate composition. A molded or extruded including such thermoplastic compositions does not drip when measured in accordance with NF P 92-505 at a thickness of 1.5 mm, and a smoke density index of less than 10 when measured in accordance with NF X 10-702 at 3 mm Useful flame retardants include, but are not limited to, organic compounds that include, but are not limited to, phosphorus, bromine, and/or chlorine. Non-brominated and non-chlorinated organic, phosphorus-containing flame retardants can be used in certain applications, for example organic phosphates and organic compounds containing phosphorus-nitrogen bonds.

In one embodiment the organic, phosphorus-containing flame retardant is an aromatic phosphate, for example triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2, 5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A (BPADP), respectively, and their oligomeric and polymeric counterparts. Exemplary flame retardant compounds containing phosphorus-nitrogen bonds include, but are not limited to, phosphonitrilic chloride, phosphorus ester amides, phosphoric acid amides, phosphonic acid amides, phosphinic acid amides, and tris(aziridinyl) phosphine oxide.

When used, organic, phosphorus-containing flame retardants, in particular di- or polyfunctional aromatic phosphorus-containing flame retardants are present in amounts of 0.1 to 30 wt. %, more specifically 1 to 20 wt. %, based on the total weight of the polymer component.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other exemplary halogenated materials include, but are not limited to, 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. In one embodiment a metal synergist is not present.

When used, halogen-containing flame retardants are present in amounts of 0.5 to 30 wt. %, more specifically 1 to 25 wt. %, based on the total weight of the polymer component.

It has been found, however, that use of a halogenated flame retardant can result in higher smoke density. Accordingly, in one embodiment, no halogenated flame retardant is present in the thermoplastic polycarbonate compositions.

The flame retardant and/or thermoplastic polycarbonate composition can further be essentially free of chlorine and bromine Essentially free of chlorine and bromine as used herein means materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 parts per million by weight (ppm), less than or equal to 75 ppm, or less than or equal to 50 ppm. When this definition is applied to the flame retardant it is based on the total weight of the flame retardant. When this definition is applied to the thermoplastic polycarbonate composition it is based on the total weight of the polymer component.

In addition to the polymer component, the thermoplastic polycarbonate compositions further include a reinforcing mineral filler. Use of reinforcing mineral filler is critical to preventing drips in NF P 92-505. Reinforcing mineral fillers include, but are not limited to, materials such as mica, clay (kaolin), talc, wollastonite, calcium carbonates (such as chalk, limestone, marble, and synthetic precipitated calcium carbonates), barium ferrite, heavy spar, and the like. Combinations of reinforcing mineral fillers can be used. Reinforcing mineral fillers can be in the form of plates or flakes having an aspect ratio (average diameter of a circle of the same area as the face of the plate to average thickness) of, e.g. 20 to 200; or needles or fibers having an aspect ratio (average length to average diameter) of, e.g., 5 to 500. The largest dimension of each particle (e.g., the diameter of a particle in the form of a flat plate) can be 0.1-10 micrometers, specifically 0.5 to 5 micrometers. The reinforcing mineral fillers can have an equivalent spherical diameter (based on volume) of 0.1 to 5 micrometers, specifically 0.01 to 3 micrometers.

It has been found that specific mineral fillers provide unexpected advantages, in particular mica talc, and clay. However, it has been further found that lower smoke density is obtained when the reinforcing mineral filler is mica or talc, rather than clay. Accordingly, in one embodiment, the thermoplastic polycarbonate compositions include less than 20 wt. %, specifically less than 10 wt. % of clay as the mineral filler, based on the total weight of the thermoplastic polycarbonate compositions. In another embodiment, the thermoplastic polycarbonate compositions contain no clay.

In addition to the polycarbonate, fluorinated polymer, impact modifier (if present), flame retardant (if present), and reinforcing mineral filler, the thermoplastic polycarbonate compositions can include various additives ordinarily incorporated into polycarbonate compositions of this type, with the proviso that the additive(s) are selected so as to not significantly adversely affect the selected properties of the thermoplastic polycarbonate composition, in particular low drip, even more particularly low drip, low smoke density, and low toxicity. Such additives can be mixed at a suitable time during the mixing of the components for forming the composition. Exemplary additives include, but are not limited to, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, and radiation stabilizers. A combination of additives can be used, for example a combination of a heat stabilizer, mold release agent, and ultraviolet light stabilizer. In general, the individual additives are used in the amounts generally known to be effective, for example 0.01 to 5 wt. %, based on the total weight of the polymer component. In general, the total combined amount of the additives is 0.1 to 10 wt. %, specifically 0.5 to 5 wt. %, based on the total weight of the polymer component. In another embodiment fibrous reinforcing agents (e.g., glass fibers) are present in addition to the foregoing additives. When used, the fibrous reinforcing agents are present in amounts from 1 to 25 wt. %, specifically 10 to 20 wt. %, based on the total weight of the polymer component.

In one embodiment, no additives other than a heat stabilizer, a light stabilizer, a plasticizer, a mold release agent, and a lubricant are present in the thermoplastic polycarbonate composition. In particular, no other particulate fillers are present. In still another embodiment, no other particulate fillers or fibrous reinforcing agents are present.

In one embodiment, no additives other than the following specifically named additives are present in the composition.

Exemplary antioxidant additives include, but are not limited to, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations including at least one of the foregoing antioxidants. Antioxidants are used in amounts of 0.01 to 0.1 wt. %, based on the total weight of the polymer component.

Exemplary heat stabilizer additives include, but are not limited to, organophosphites such as triphenyl phosphite, tris-(2,6-dimethylphenyl)phosphite, tris-(mixed mono- and di-nonylphenyl)phosphite; phosphonates such as dimethylbenzene phosphonate; phosphates such as trimethyl phosphate; and combinations including at least one of the foregoing heat stabilizers. Heat stabilizers are used in amounts of 0.01 to 0.1 wt. %, based on the total weight of the polymer component.

Light stabilizers and/or ultraviolet light (UV) absorbing additives can also be used. Exemplary light stabilizer additives include, but are not limited to, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations including at least one of the foregoing light stabilizers. Light stabilizers are used in amounts of 0.01 to 5 wt. %, based on the total weight of the polymer component.

Exemplary UV absorbing additives include, but are not limited to, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethyl-butyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene)bis(4H-3,1-benzoxazin-4-one); 1,3-bis[(2-cyano-3,3-diphenylacryloyl)oxy-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or combinations including at least one of the foregoing UV absorbers. UV absorbers are used in amounts of 0.01 to 5 wt. %, based on the total weight of the polymer component.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; poly-alpha-olefins; epoxidized soybean oil; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants including polyethylene glycol polymers, polypropylene glycol polymers, poly(ethylene glycol-co-propylene glycol) copolymers, or a combination including at least one of the foregoing glycol polymers, e.g., methyl stearate and polyethylene-polypropylene glycol copolymer in a solvent; and waxes such as beeswax, montan wax, and paraffin wax. Such materials are used in amounts of 0.1 to 1 wt. %, based on the total weight of the polymer component.

The relative amounts of each component in the thermoplastic polycarbonate compositions is an important factor in obtaining the selected levels of flame retardance, in particular low drip, optionally together with low smoke density and low toxicity, as well as advantageous physical properties such as ductility. As previously mentioned, use of one component for one advantageous purpose (e.g., a fluoropolymer) can unexpectedly result in adversely affecting another selected property, particularly when the amount of the component is lower or higher than disclosed herein.

In one embodiment, a thermoplastic polycarbonate composition wherein a molded or extruded has very low dripping is achieved using, based on the total weight of the thermoplastic polycarbonate composition: 15 to less than 40 wt. % of a reinforcing mineral filler; and greater than 60 to 85 wt. % of a polymer component, including, based on the weight of the polymer component, 68 to 99.9 wt. % of an aromatic polycarbonate, 0.1 to 2 wt. % of a fluorinated polymer, optionally, 0.1 to 25 wt. % of an impact modifier; and optionally, 0.1 to 5 wt. % of an additive composition including an antioxidant, a mold release agent, and a stabilizer. A molded or extruded of the thermoplastic polycarbonate composition has no drips when measured in accordance with NF P 92-505 at a thickness of 3.0 mm. In a specific embodiment, the thermoplastic polycarbonate composition includes less than 20 wt. % of a clay as the reinforcing mineral filler, based on the total weight of the thermoplastic polycarbonate composition. In another specific embodiment, the reinforcing mineral filler is talc, mica, or a combination of talc and mica. In another specific embodiment, the thermoplastic polycarbonate composition includes less than 6 wt. % of free styrene-acrylonitrile, based on the total weight of the polymer component, wherein a molded or extruded of the composition has 100% ductility in a multi-axial impact test at 23° C., measured in accordance with ISO 6603. In still another specific embodiment, the thermoplastic polycarbonate composition includes 15 to 22 wt. % of the reinforcing mineral filler, wherein the filler is talc; 0 wt. % clay; 78 to 85 wt. % of the polymer component, wherein the polymer component includes 86 to 95.5 wt. % polycarbonate; 1 to 5 wt. % of bulk acrylonitrile-butadiene styrene; 0.5 to 1.0 wt. % of silicone oil; no halogenated flame retardants; and 3 to 8 wt. % of an aromatic diphosphate flame retardant.

In order to obtain compositions wherein a molded or extruded has no drips when measured in accordance with NF P 92-505 at a thickness of 1.5 mm, and a smoke density index of less than 10 when measured in accordance with NF X 10-702 at a thickness of 3 mm, the thermoplastic polycarbonate compositions include greater than 10 to less than 40 wt. % of a reinforcing mineral filler; and greater than 60 to less than 90 wt. % of a polymer component, wherein the polymer component includes 68 to 99.9 wt. % of an aromatic polycarbonate, specifically a bisphenol A homopolycarbonate; 0.1 to 2 wt. % of a fluorinated polymer; optionally, 0.1 to 25 wt. % of an impact modifier; and optionally, 0.1 to 5 wt. % of an additive composition including an antioxidant, a mold release agent, and a stabilizer. A molded or extruded including these compositions further attains a UL94 rating of 5VB at a thickness of 2.0 mm More than 2 wt. % of the fluoropolymer tends to increase dripping when measured in accordance with NF P 92-505. This illustrates that dripping behavior in the UL94 and NF P 92-505 tests cannot be correlated, as an increase in fluorinated polymer level prevents dripping in the UL94 tests.

In a specific embodiment, the mineral filler in this composition is mica, talc, or a combination of mica and talc. In another specific embodiment, the composition includes less than 20 wt. % of clay, based on the total weight of the composition. When less clay is used (or is absent), less smoke is generated, as measured in accordance with NF X 10-702. A molded or extruded of such compositions can further attain a UL94 V0 rating at a thickness of 1.6 mm. When the composition includes less than 10 wt. % of clay, based on the total weight of the composition, a molded or extruded of the composition has no drips when measured in accordance with NF P 92-505 at a thickness of 3 mm. Still more specifically, no clay is present in this embodiment.

In order to obtain compositions wherein a molded or extruded has no drips when measured in accordance with NF P 92-505 at a thickness of 3 mm, and a molded or extruded has a smoke density index of less than 10 when measured in accordance with NF X 10-702 at a thickness of 3 mm, the thermoplastic polycarbonate compositions include from 12 to less than 40 wt. %, specifically from 15 to less than 40 wt. % of a reinforcing mineral filler; and greater than 60 to less than 88 wt. %, specifically greater than 60 to 85 wt. % of a polymer component, wherein the polymer component includes 68 to 99.9 wt. % of an aromatic polycarbonate, specifically a bisphenol A homopolycarbonate; 0.1 to 2 wt. % of a fluorinated polymer; optionally, 0.1 to 25 wt. % of an impact modifier; and optionally, 0.1 to 5 wt. % of an additive composition including an antioxidant, a mold release agent, and a stabilizer. When the foregoing composition includes less than 30 wt. % of the reinforcing mineral filler, a molded or extruded of the composition attains a UL94 V0 rating at a thickness of 1.6 mm. In a specific embodiment, the mineral filler in this composition is mica, talc, or a combination of mica and talc. In another specific embodiment, the composition includes less than 20 wt. % of clay, specifically less than 10 wt. % of clay, based on the total weight of the composition. When less clay is used (or is absent), less smoke is generated, as measured in accordance with NF X 10-702. Again, a molded or extruded of such compositions can further attain a UL94 V0 rating at a thickness of 1.6 mm. Still more specifically, no clay is present in this embodiment.

Use of talc is especially advantageous, in that it unexpectedly reduces smoke density of molded or extruded samples tested in accordance with NF X 10-702. In one embodiment, the thermoplastic polycarbonate composition includes from 15 to 22 wt. % talc, and 78 to 85 wt. % of a polymer component, wherein the polymer component includes 68 to 99.9 wt. % of an aromatic polycarbonate, specifically a bisphenol A homopolycarbonate; 0.1 to 2 wt. % of a fluorinated polymer; optionally, 0.1 to 25 wt. % of an impact modifier; and optionally, 0.1 to 5 wt. % of an additive composition including an antioxidant, a mold release agent, and a stabilizer.

In any of the foregoing embodiments, an impact modifier can be present in an amount from 0.1 to 25 wt. % of the polymer component. The specific amounts will depend on the type of impact modifier used. In one embodiment, the presence of an impact modifier such as ABS or MBS improves the ductility of the compositions. Ductility can be quantitated as a percentage of molded or extruded samples that show ductile failure (e.g., the sample remains in one piece and shows no hinge break). For convenience, as used herein, compositions wherein 5 molded or extruded samples of the compositions all have ductile failure in a multi-axial impact test measured at 23° C. in accordance with ISO 6603 are referred to as having 100% ductility. In another embodiment, the composition includes no additional free SAN, wherein a molded or extruded of the composition has no drips when measured in accordance with NF P 92-505 at a thickness of 3 mm.

In one embodiment, the impact modifier is an organopolysiloxane, present in an amount effective to provide a composition including 2 to 8 wt. % of siloxane units, based on the weight of the polymer component. Molded or extruded samples including such compositions can have improved ductility, in particular 100% ductility in a multi-axial impact test measured at 23° C. in accordance with ISO 6603.

In a specific embodiment, the organopolysiloxane impact modifier is a polycarbonate-polysiloxane copolymer, present in an amount of 1 to 25 wt. %, specifically 2 to 15 wt. %, based on the weight of the polymer component. Molded or extruded samples of such compositions can have 100% ductility in a multi-axial impact test, measured at 23° C. in accordance with ISO 6603.

In another specific embodiment, the impact modifier is a silicone oil. The silicon oil is present in an amount of 0.1 to 5 wt. %, specifically 0.25 to 2 wt. %, based on the total weight of the polymer component. Molded or extruded samples of such compositions can have 100% ductility in a multi-axial impact test, measured at 23° C. in accordance with ISO 6603. Use of talc is especially advantageous in this embodiment. Thus, the thermoplastic polycarbonate composition can include from 15 to 22 wt. % talc, and 78 to 85 wt. % of a polymer component, wherein the polymer component includes 93 to 99.8 wt. % of an aromatic polycarbonate, specifically a bisphenol A homopolycarbonate; 0.1 to 5 wt. %, specifically 0.25 to 2 wt. %, of a silicone oil; and 0.1 to 2 wt. % of a fluorinated polymer, specifically TSAN or PTFE associated with another polymer. Molded or extruded samples including such compositions can attain an M1 or M2 rating at a thickness of 4 mm. When 0.5 to 2 wt. % of the fluorinated polymer is present, a molded or extruded of the composition can have 100% ductility in a multi-axial impact test measured at 23° C. in accordance with ISO 6603, and molded or extruded samples from 1 mm to 4 mm in thickness, or even 1 to 8 mm in thickness, can have an M1 rating. It is also possible for such samples to obtain both an M1 and an F1 rating. When the fluorinated polymer is encapsulated PTFE (particularly TSAN), a 4 mm thick molded or extruded of the composition attains an M1/F1 rating.

In any of the foregoing embodiments, the compositions can further include from 0.5 to 15 wt. %, specifically from 1 to 8 wt. %, more specifically from 2 to 8 wt. %, and even more specifically 3 to 8 wt. % of an organic phosphorus-containing flame retardant. In one embodiment, the organic, phosphorus-containing flame retardant is an aromatic compound, even more specifically an aromatic diphosphate, still more specifically a diphosphate based on bisphenol A.

Further in any of the foregoing embodiments, the thermoplastic polycarbonate compositions include no brominated flame retardants, in particular no brominated polycarbonate flame retardants, wherein a molded or extruded of the composition has a smoke density index of less than 10 when measured in accordance with NF X 10-702.

A flow modifier can be present in the composition. For example, use of up to 5 wt. % of a rubber-based impact modifier (such as bulk polymerized ABS, which contains SAN), based on the weight of the polymer component, can provide improved flow. However, as described above, less than 6 wt. % of free SAN, specifically less than 3 wt. % of the free SAN, and more specifically 0 wt % of free SAN, based on the total weight of the polymer component, is added or present in the compositions.

An excellent combination of flame retardance, low smoke density (or index), and physical properties are obtained when the thermoplastic polycarbonate compositions include, based on the total weight of the thermoplastic polycarbonate composition, 15 to 22 wt. % of talc, mica, or a combination including talc and mica, specifically talc, and clay in an amount of less than 20 wt. %, less than 10 wt. %, or specifically 0 wt. % of the total weight of the thermoplastic polycarbonate composition; and 78 to 85 wt. % of a polymer component, wherein the polymer component includes, based on the weight of the polymer component, 79 to 98.7 wt. % of a polycarbonate, specifically a polycarbonate including units derived from bisphenol A; 0.1 to 2 wt. % of a fluorinated polymer (specifically TSAN) or 0.3 to 1 wt. %, specifically 0.5 to 1 wt. % of PTFE associated with a thermoplastic, fluorinated polymer having a fluorinated backbone; 1 to 8% of an phosphorus-containing flame retardant including units derived from bisphenol A; 0 to 5 wt. %, specifically 1 to 5 wt. % of a bulk ABS; 0.1 to 5 wt. %, specifically 0.5 to 1 wt. % of a silicone oil; and 0.1 to 1 wt. %, specifically 0.5 to 1 wt. % of an additive composition including an antioxidant, a mold release agent, and a stabilizer. A molded or extruded of this thermoplastic polycarbonate composition has no drips when measured in accordance with NF P 92-505; a smoke density index of less than 10 when measured in accordance with NF X 10-702 at a thickness of 3.0 mm; 100% ductility in a multi-axial impact test at 23° C., measured in accordance with ISO 6603; and an M1 rating at a thickness of 4 mm.

In one aspect of the foregoing embodiment, the thermoplastic polycarbonate composition includes, based on the total weight of the composition, 15 to 22 wt. % of the reinforcing mineral filler, wherein the filler is talc, and 0 wt. % clay; and 78 to 85 wt. % of a polymer component, wherein the polymer component includes 86 to 95.5 wt. % of the polycarbonate, specifically a bisphenol A homopolycarbonate; 1 to 5 wt. % of bulk acrylonitrile-butadiene styrene; 0.5 to 1.0 wt. % of silicone oil; 0 wt. % halogenated flame retardants; and 3 to 8 wt. % of an aromatic diphosphate flame retardant.

Certain of the foregoing compositions can attain an F1 rating in the "F test" in accordance with NF F 16-101, which is a combination of the smoke density test NF X 10-702, and the smoke toxicity test NF X 70-100.

The thermoplastic polycarbonate compositions can be manufactured by various methods. For example, powdered polycarbonate, fluoropolymer, and other components are first blended, optionally with fillers in a HENSCHEL® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a selected polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as selected. Such pellets can be used for subsequent molding, shaping, or forming.

The polycarbonate compositions have excellent physical properties, including a melt volume ratio (MVR) of 5 to 20, more specifically 8 to 15 $cm^3/10$ minutes, measured at 260° C. under a load of 5 kg in accordance with ISO 1133.

The polycarbonate compositions can have a melt viscosity (MV) of 200 to 1000, more specifically 300 to 700 Pa·sec, measured at 280° C. at 500 $sec^{-1}$ in accordance with ISO 11443.

The polycarbonate compositions can further have a heat deflection temperature (HDT) of 100 to 140° C., more specifically 110 to 130° C., measured at 1.8 MPa according to ISO 75.

The polycarbonate compositions can further have a multi-axial impact (MAI) of 20 to 130 Joules (J), or 60 to 120 J, measured at 23° C. using 3.2 mm plaques in accordance with ISO 6603.

Shaped, formed, or molded articles including the polycarbonate compositions are also provided. Articles can be manufactured using a variety of processes, for example injection molding, extrusion, rotational molding, blow molding, and thermoforming Exemplary articles include, but are not limited to, those for transportation and construction applications, and include flat panels, thermoformed parts formed from sheets, and other structural components for trains, aircraft, buses, automobiles, and the like; and structural components for buildings such as hospitals, schools, and the like. In addition, the polycarbonate compositions can be used for applications such as computer and business machine housings (such as housings for monitors), handheld electronic device housings (such as housings for cell phones), electrical connectors, and components of lighting fixtures, ornaments, home appliances, roofs, greenhouses, sun rooms, swimming pool enclosures, and the like.

In a specific embodiment the polycarbonate compositions can be used to form sheets, specifically a flat sheet with low dripping and low smoke density index as described above. Such sheets are useful by themselves, or in combination with a substrate, and can be used in articles for the transportation and construction industry, such as in schools, hospitals, and the like. Such articles include, but are not limited to, ceilings, sidewalls, bin doors, partitions, window masks, seats, seat back shrouds, seatbacks, armrests, tray-tables, storage bins, and luggage racks in automobiles, trains, buses, and aircraft. Specific examples include, but are not limited to, hospital walls, aircraft interiors and seating, walls, ceilings, claddings, and window surroundings in railway applications.

The sheets can be formed by processes such as sheet extrusion, injection molding, gas-assist injection molding, extrusion molding, compression molding, blow molding, and combinations including at least one of the foregoing processes. Specific sheet extrusion processes include, but are not limited to, melt casting, blown sheet extrusion, and calendaring. Co-extrusion and lamination processes can be used to form multilayer sheets. The sheets can alternatively be prepared by casting a solution or suspension of the polycarbonate composition in a suitable solvent onto a substrate, belt, or roll, followed by removal of the solvent. Single or multiple layers of coatings can also be applied to the single or multilayer sheets to impart additional properties such as scratch resistance, ultra violet light resistance, aesthetic appeal, and the like. Coatings can be applied through standard application techniques such as rolling, spraying, dipping, brushing, flow coating, or combinations including at least one of the foregoing application techniques.

Oriented sheets can be prepared by blown sheet extrusion or by stretching cast or calendared sheets in the vicinity of the thermal deformation temperature using standard stretching techniques. For instance, a radial stretching pantograph can be used for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The polycarbonate compositions can also be used to form a multiwall sheet including a first sheet having a first side and a second side, wherein the first side of the first sheet is disposed upon a first side of a plurality of ribs; and a second sheet having a first side and a second side, wherein the first side of the second sheet is disposed upon a second side of the plurality of ribs, and where the first side of the plurality of ribs is opposed to the second side of the plurality of ribs. The first and/or the second sheets include the polycarbonate compositions.

The sheets and multiwall sheets can be thermoplastically processed into shaped articles via forming and molding processes such as thermoforming, vacuum forming, pressure forming, injection molding, and compression molding. Multilayered shaped articles can be formed by injection molding a thermoplastic resin onto a single or multilayer sheet by first providing a single or multilayer substrate, and optionally having one or more colors on a surface thereof, for instance, using screen printing or a transfer dye; conforming the substrate to a mold configuration such as by forming and trimming a substrate into a three dimensional shape and fitting the substrate into a mold having a surface that matches the three dimensional shape of the substrate; then injecting a thermoplastic resin into the mold cavity behind the substrate to (i) produce a one-piece permanently bonded three-dimensional product or (ii) transfer a pattern or aesthetic effect from the printed substrate to the injected resin, and removing the printed substrate, thus imparting the aesthetic effect to the molded resin. Either or both of the substrate and the thermoplastic resin can include the polycarbonate compositions as described herein.

Curing and surface modification processes such as heat-setting, texturing, embossing, corona treatment, flame treatment, plasma treatment, and vacuum deposition can further be applied to the above articles to alter surface appearances and impart additional functionality to the articles.

In a specific embodiment, the polycarbonate compositions are extruded and formed into sheets having a thickness of greater than or equal to 0.5 mm, specifically greater than or equal to 4 mm, and more specifically greater than or equal to 5 mm. For example, the sheet can have a thickness of 1.0 to 6.0 mm. Unexpectedly, sheets having a thickness of 4.0 to 6.0 mm attained an M1 rating according to NF F 16-101. Such sheets can be subsequently thermoformed. The thermoformed sheets can have no surface defects, i.e., a smooth and uniform surface appearance as viewed by the unaided eye. In particular, sheets have no pits or wavy lines as viewed by the naked eye.

The thermoplastic polycarbonate compositions are further illustrated by the following non-limiting examples.

EXAMPLES

The thermoplastic polycarbonate compositions described in the following examples were prepared from the components described in Table 1.

In each of the examples, samples were prepared by melt extrusion on a Werner & Pfleiderer™ 25 mm twin screw extruder at a nominal melt temperature of about 260° C., about 0.7 bars of vacuum, and about 300 rpm. The extrudate was pelletized and dried at about 100° C. for about 4 hours. To make test specimens, the dried pellets were molded on an Engel™ 110-ton injection molding machine at a nominal melt temperature of 280° C., with the melt temperature approximately 5 to 10° C. higher. Test specimens for smoke and drip testing were injection molded on an Engel™ 75-ton injection molding machine at a nominal melt temperature of 280° C., with the melt temperature approximately 5 to 10° C. higher. Test specimens for the M-test were molded on an Engel™ 400-ton injection molding machine at a nominal melt temperature of 290° C., with the melt temperature approximately 5 to 10° C. higher.

The test standards shown in Table 2 were used in evaluation of the Examples.

TABLE 1

| | Description | Supplier |
|---|---|---|
| PC-1 | Linear bisphenol A (BPA) homopolycarbonate (melt polymerized); Mw = 31,000 (polycarbonate standards) | SABIC Innovative Plastics |
| PC-2 | Linear bisphenol A homopolycarbonate (melt polymerized); Mw = 22,000 (polycarbonate standards) | SABIC Innovative Plastics |
| PC-3 | Linear bisphenol A homopolycarbonate (melt polymerized); Mw = 35,000 (polycarbonate standards) | SABIC Innovative Plastics |
| PC-BR | Polycarbonate copolymer of bisphenol A and tetrabromobisphenol A | SABIC Innovative Plastics |
| SAN | SAN copolymer with an acrylonitrile content of about 15-35%, MFR (220° C./1.2 kg) of 18-24 g/10 min (trade name PolySAN 2537). | SABIC Innovative Plastics |
| PC-Si | BPA polycarbonate-polysiloxane copolymer, 80/20 weight %/weight %, PCP end capped | SABIC Innovative Plastics |
| MBS | Impact modifier powder, having a nominal 75 to 82 wt. % butadiene core with the balance a styrene-methyl methacrylate shell (Trade name EXL-2691A) | Rohm and Haas |
| ABS | Emulsion polymerized ABS including about 52 weight % polybutadiene, 12 weight % acrylonitrile, 36 weight % styrene | SABIC Innovative Plastics |
| BABS | Bulk polymerized ABS including about 16 weight % polybutadiene, 15 weight % acrylonitrile, 69 weight % styrene | SABIC Innovative Plastics |
| Silicone oil | PDMS silicone oil (1000 cps) (trade name Baysilone Fluid M1000) | Momentive Performance Materials |
| BPADP | Bisphenol A diphosphate (NcendX ® P-30) | Albemarle |
| RDP | Tetraphenyl resorcinol diphosphate (trade name Fyrolflex RDP) | Supresta |
| Talc | LUZENAC fine talc (magnesium silicate hydrate), LUZENAC grade Jetfine 3CA. The talc is treated with a 45% $H_3PO_3$ solution in water from Quaron (3 wt. % based on the total weight of talc (e.g., 25 g of talc is treated with 0.75 g of acid solution) | Luzenac |
| Clay | Uncalcinated hydrated aluminum silicate (trade name POLYFIL HG-90) | Huber |
| $TiO_2$ | Titanium dioxide (trade name Kronos 2450) | Kronos |
| TSAN | PTFE encapsulated in SAN (50/50 weight %/weight %) | SABIC Innovative Plastics |
| Co-PTFE | Composition including 70 wt % PTFE and 30 wt. % of a terpolymer (trade name 3M ® MM 5935 EF) | 3M |
| Mica | Natural potassium-aluminum-silicate-hydrate (trade name Aspanger Mica SFG20) | Quartzwerke |
| $BaSO_4$ | Synthetic barium sulfate (trade name Velvolux K3) | Sachtleben corp. |

TABLE 2

| | Test | Standard | Condition |
|---|---|---|---|
| MVR | Melt volume-flow rate | ISO 1133 | 260° C./5 kg |
| MV | Melt viscosity | ISO 11443 | 280° C., 500$^{-1}$ |
| Vicat | Vicat softening point | ISO 306 | B120 (50N, 120° C./h) |
| HDT | Heat deflection temperature | ISO 75 | A/f (1.8 MPa, flat) |
| INI | Izod notched impact | ISO 180 | 23° C., 5.5 J |
| MAI | Multi-axial impact | ISO 6603 | 23° C., 2.25 m/s (unless indicated otherwise) |
| Tensile | Tensile test | ISO 527 | 5 mm/min |
| V0 | Vertical burning V0 | UL94 | 1-2 mm |
| 5VB | Vertical burning 5VB | UL94 | 2 mm |
| Drip | Drip test | NF P 92-505 | 1 to 6 mm samples |
| Smoke | Smoke density | NF X 10-702 | 1 to 6 mm samples |
| M-test | Combination of epiradiateur (NF P 92-501) and drip (NF P 92-505) tests | NF F 16-101 | 1 to 6 mm samples |
| F-test | Combination of smoke density (NF X 10-702) and smoke toxicity (NF X 70-100) tests | NF F 16-101 | 1 to 6 mm samples |
| E Modulus | Elastic Modulus (3 point bending test) | ISO 178 | Stress = 2 kN, speed = 2 mm/minute |

Ductility is indicated as a percentage of the bars/plaques that show ductile failure (e.g. the part remains in one piece and shows no hinge break).

The drip test is conducted in accordance with the FR-1 French Ministerial NF P 92-505 test, also known as the French drip test. In pertinent part, the test records the behavior of droplets produced by applying a heat to a specimen of the material to be tested. The heat is applied by a radiator disposed horizontally to a sheet or plaque of 70×70 mm (the horizontal radiator has a radiation of 500 watts (W) at an intensity of 3 watts per square centimeter (W/cm$^2$) at a distance to the sample of 3 centimeters (cm)). The drip test results are indicated as "no drip" (ND), "drip" (D), and "burning drip" (BD). Only a result of burning drip is considered a fail, but non-burning drip is an indication of non-robust anti-dripping behavior.

The smoke density test is conducted in accordance with NF X 10-702, which is similar to the smoke density specifications for aircraft compartment interiors as set forth in the American Society for Testing and Materials (ASTM) standard E662 (2006). This test method uses a photometric scale to measure the density of smoke generated by the material. The maximum smoke density (Ds max), the average smoke density over the first 4 minutes (VOF4) and smoke density index (SDI) are determined, where:

$$VOF4 = \tfrac{1}{2}Ds0 + Ds1 + Ds2 + Ds3 + \tfrac{1}{2}Ds4$$

$$SDI = (Ds\,max/100) + (VOF4/30)$$

wherein:
Ds0 is the smoke density at 0 minutes,
Ds 1 is the smoke density at 1 minute,
Ds2 is the smoke density at 2 minutes,
Ds3 is the smoke density at 3 minutes, and
Ds4 is the smoke density at 4 minutes.

The F-rating is determined from the "IF" value, which in turn is derived from the smoke density index (SDI) and smoke toxicity index (ITC) as follows:

$$IF = SDI + (ITC/2).$$

SDI is determined from measurement of VOF4 and Ds max as described above, on three samples. ITC is determined for one sample according to NF X 70-100, by combusting a 1-gram sample in a tube furnace at 600° C. under a constant airflow of 120 liters/hour. The gasses produced are analyzed and the concentration of each gas Y is determined ([gas Y]). For each of the gases CO, $CO_2$, HCl, HBr, HCN, HF, and $SO_2$, the concentration of the gas Y is divided by the critical concentration ($CC_Y$), wherein $CC_{CO}=1{,}750$, $CC_{CO2}=90{,}000$, $CC_{HCl}=150$, $CC_{HBr}=170$, $CC_{HCN}=55$, $CC_{HF}=17$, and $CC_{SO2}=260$. The sum of those values constitutes the value of ITC, using the formula:

$$ITC = S[\text{gas } Y]/CC_Y$$

An IF value of less than 20 results in a rating of F1. To achieve a rating of F2, F3 and F4, the IF value should be below 40, 80 or 120, respectively.

The "M-test" is a combination of epiradiateur (NF P 92-501) and drip (NF P 92-505) tests. For the M-test, the Q-value is determined according to NF P 92-501, which is calculated as:

$$Q = \frac{100 \Sigma h}{t_i \sqrt{\Delta t}}$$

wherein:
Σh=sum of flame heights over each 30 sec. period (cm);
$t_i$=ignition time (seconds); and
Δt=total combustion time (seconds).

To achieve a rating of M1, 4 samples tested in accordance with NF P 92-501 have a value of Q below 2.5 and show no dripping. To achieve a rating of M2 and M3, the maximum Q-values allowed are 15 and 50, respectively. The same rating can still be applied if no dripping occurs when 4 samples are tested in accordance with NF P 92-505. If flaming drips are produced during this test, the samples are rated M4.

The examples were also evaluated for flammability following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as UL94 HB, V0, V1, V2, 5VA, and/or 5VB. Samples tested in accordance with UL94 are rated as a pass (P) or fail (F) at the given thickness.

To achieve a V0 rating (pass) in UL94 means that a flame was applied to a vertically fastened, 5-inch (127 mm) by 0.5-inch (12.7 mm) test bar of a given thickness above a dry, absorbent cotton pad located 12 inches (305 mm) below the bar.

Calipers determine the thickness of the test bar with 0.1 mm accuracy. The flame is a ¾-inch (19 mm) flame. The flame is applied for 10 seconds at a distance of 0.38 inch (9.5 mm) from the lower part of the test specimen and then removed. After this application a timer (T-0) is started and the time that the specimen continues to flame (after-flame time), as well as any time the specimen continues to glow after the after-flame goes out (after-glow time), is measured by stopping the timer T-0 when the after-flame stops, unless there is an after-glow and then T-0 is stopped when the after-glow stops. As soon as the sample stops burning the flame is again applied for another 10 seconds. After this second application the combined after-flame time and after-glow time are again determined. The combined after-flame and after-glow times of both flame applications are added and must be less than or equal to 10 seconds after removing the igniting flame and none of the vertically placed samples produces drips of burning particles that ignite absorbent cotton. The test is repeated on five identical bar specimens. If there is a single specimen of the five that does not comply with the time and/or no-drip specifications, then a second set of five specimens is tested in the same fashion. All of the specimens in the second set of five specimens should comply with the specifications for material in the given thickness to achieve the V0 rating.

To achieve a 5VB rating (pass) in UL94 means that a flame is applied at a 20° angle to a vertically fastened, 5-inch (127 mm) by 0.5-inch (12.7 mm) test bar of a given thickness above a dry, absorbent cotton pad located 12 inches (305 mm) below the bar. Calipers determine the thickness of the test bar with 0.1 mm accuracy. The flame is a 5-inch (127 mm) flame with an inner blue cone of 1.58 inches (40 mm). The flame is applied to the test bar for 5 seconds so that the tip of the blue cone touches the lower corner of the specimen. The flame is then removed for 5 seconds. Application and removal of the flame is repeated until the specimen has had five applications of the same flame. After the fifth application of the flame is removed, a timer (T-0) is started and the time that the specimen continues to flame (after-flame time), as well as any time the specimen continues to glow after the after-flame goes out (after-glow time), is measured by stopping T-0 when the after-flame stops, unless there is an after-glow and then T-0 is stopped when the after-glow stops. The combined after-flame and after-glow time must be less than or equal to 60 seconds after five applications of a flame to a test bar, and there can be no drips that ignite the cotton pad. The test is repeated on five identical bar specimens. If there is a single specimen of the five that does not comply with the time and/or no-drip requirements, then a second set of five specimens is tested in the same fashion. All of the specimens in the second set of five specimens must comply with the requirements in order for material in the given thickness to achieve the 5VB rating.

In the following formulations, the amount of each ingredient in the polymer component is given in weight percent, based on the total weight of the polymer component. The amount of filler in each of the following formulations is based on the total weight of the polymer component plus filler. For example 20 wt. % filler in the below Tables means that for each 1 kg of the polymer component, 250 g of filler was added (250 g/(1000 g+250 g)=20 wt. %).

Further in the following formulations, the indicated amount of an additive package (antioxidant, mold release agent, and stabilizer) was present.

Examples 1-10

Examples 1-10 were formulated using polycarbonate, no impact modifier, an aromatic diphosphate flame retardant, and varying amounts of a mineral filler. Results are shown in Table 3.

TABLE 3

| Component | Units | 1* | 2* | 3 | 4 | 5 | 6 | 7 | 8 | 9* | 10* |
|---|---|---|---|---|---|---|---|---|---|---|---|
| PC-1 | % | 9.96 | 9.96 | 9.96 | 9.96 | 9.96 | 9.96 | 9.96 | 9.96 | 9.96 | 9.96 |
| PC-2 | % | 86.78 | 86.78 | 86.78 | 86.78 | 86.78 | 86.78 | 86.78 | 86.78 | 86.78 | 86.78 |
| BPADP | % | 2 | 2 | 2 | 2 | 2 | 2 | 2 | 2 | 2 | 2 |
| TSAN | % | 0.8 | 0.8 | 0.8 | 0.8 | 0.8 | 0.8 | 0.8 | 0.8 | 0.8 | 0.8 |
| Additives | % | 0.46 | 0.46 | 0.46 | 0.46 | 0.46 | 0.46 | 0.46 | 0.46 | 0.46 | 0.46 |
| TOTAL | % | 100 | 100 | 100 | 100 | 100 | 100 | 100 | 100 | 100 | 100 |
| Talc | % | — | 10 | 12 | 14 | 15 | 18 | 20 | 30 | 40 | 50 |
| Properties | Unit | | | | | | | | | | |
| MVR | cc/10 min | 29 | 22 | 23 | 18 | 20 | 19 | 18 | 21 | Melt strength | |
| MV | Pa·s | 306 | 307 | 263 | 313 | 305 | 310 | 286 | 260 | too poor for | |
| Vicat | °C. | 135 | 136 | 137 | 137 | 136 | 137 | 136 | 137 | compounding | |
| INI Impact | kJ/m$^2$ | 7 | 8 | 8 | 7 | 7 | 6 | 6 | 4 | | |
| Ductility | % | 0 | 0 | 0 | 0 | 0 | 0 | 0 | 0 | | |
| MAI Impact | J | 94 | 95 | 89 | 87 | 91 | 26 | 73 | 2 | | |
| Ductility | % | 100 | 100 | 100 | 100 | 100 | 0 | 0 | 0 | | |
| Tensile Modulus | GPa | 2.5 | 3.7 | 3.9 | 4.1 | 4.3 | 4.7 | 5.1 | 6.3 | | |
| Elongation | % | 57 | 38 | 26 | 8 | 7 | 5 | 5 | 2 | | |
| V0 1.0 mm | P/F | | | P | P | | F | | | | |
| 1.6 mm | P/F | P | P | P | P | P | P | P | F | | |
| 2.0 mm | P/F | | | P | P | | P | | | | |
| 5 VB 2 mm | P/F | F | P | P | P | P | P | P | P | | |
| Drip 1.5 mm | D/ND/BD | D | D | ND | ND | ND | ND | ND | ND | | |
| 3 mm | D/ND/BD | BD | BD | BD | BD | D | ND | ND | ND | | |
| Smoke 1.5 mm | Ds max - | 117 | 85 | | | 118 | | 143 | 182 | | |
| | VOF4 | 128 | 16 | | | 61 | | 67 | 126 | | |
| | SDI | 5.4 | 1.4 | | | 3.2 | | 3.7 | 6.0 | | |
| Smoke 3 mm | Ds max | 245 | 259 | 228 | 199 | 196 | 222 | 219 | 283 | | |
| | VOF4 | 267 | 234 | 312 | 147 | 162 | 92 | 75 | 79 | | |
| | SDI | 11.4 | 10.4 | 12.7 | 6.9 | 7.3 | 5.3 | 4.7 | 5.5 | | |

*Comparative Example

None of Examples 1-8 is ductile in an Izod notched impact test at 23° C. Addition of 18 wt. % or more of a reinforcing mineral filler adversely affects the ductility of the samples in a multi-axial impact test, as seen by Examples 6-8.

It can further be seen from the data in Table 3 that the presence of less than 10 wt. % of a reinforcing mineral filler improves the UL94 5VB pass rate (Ex. 1 vs. Ex. 2, 2 mm). The addition of more than 10 wt. % of the reinforcing mineral filler prevents dripping in thinner (1.5 mm) samples (Ex. 2 vs. Ex. 5 and Exs. 7-8). Addition of more than 15 wt. % of the reinforcing mineral filler also prevents drip in thicker (3 mm) samples (Ex. 5 vs. Exs. 7-8). Use of 15 wt. % or more of reinforcing mineral filler further significantly reduces smoke at 3 mm (Ex. 2 vs. Ex. 5 and Exs. 7-8). The reduction in smoke cannot be explained solely as a dilution effect of the polymer with non-combustible material, since at 20 wt. % reinforcing mineral filler (Ex. 1) the smoke density index is reduced by about 60% at 3 mm, compared to 10% reinforcing mineral filler (Ex. 2). It is noted, however, that at higher loadings of reinforcing mineral filler (18 wt. %, Ex. 6), the samples fail UL94 V0 at 1.0 mm and at even higher loadings (30 wt. %, Ex. 8), the samples fail UL94 V0 at 1.6 mm. Use of 40 wt. % or more reinforcing mineral filler results in samples with poor melt strength (Exs. 9-10). This data shows that it is more difficult for thicker samples to pass the drip test, while it is more difficult for thinner samples to achieve a UL94 rating of V0. These combined results show that there is no correlation between the drip test and the UL94 test standards.

Examples 1, 7, and 11-15

The following examples were formulated using polycarbonate, no impact modifier, an aromatic diphosphate flame retardant, and 20 wt. % of different mineral fillers, including talc, clay, titanium dioxide, mica, barium sulfate, and a combination of talc and clay.

Table 4 again shows that compositions having no impact modifier have low ductility in an Izod notched impact test at 23° C. Addition of 20 wt. % or more of talc or clay adversely affects the ductility of the samples in a multi-axial impact test.

Table 4 also shows that $BaSO_4$ (which, like $TiO_2$, is a non-reinforcing filler) is not effective to reduce drip (Ex. 14). Mica, a reinforcing filler, reduces drip at 1.5 mm, but is not as effective to reduce smoke (Ex. 13) as is talc (e.g., Ex. 7).

Table 4 further shows that improvement in drip characteristics of the compositions occurs when reinforcing mineral fillers (talc and clay, Ex. 7, Ex. 11, and Ex. 15) are used, whereas a non-reinforcing mineral filler ($TiO_2$, Ex. 9) shows little increase in modulus and does not prevent dripping. Use of 20 wt. % of a clay as the reinforcing mineral filler leads to increased smoke formation (Ex. 12). The presence of 20 wt. % of clay (Ex. 12) results in the samples not achieving a UL94 V0 or 5VB rating. The presence of 10 wt. % clay and 10 wt. % of talc combined leads to a Fail of the UL94 V0 test.

Examples 16-20

Examples 16-20 were formulated using varying amounts of clay as the reinforcing mineral filler. Results are shown in Table 5.

TABLE 4

| | | Units | 1* | 7 | 11* | 12* | 13* | 14* | 15 |
|---|---|---|---|---|---|---|---|---|---|
| PC-1 | | % | 9.96 | 9.96 | 9.96 | 9.96 | 9.96 | 9.96 | 9.96 |
| PC-2 | | % | 86.78 | 86.78 | 86.78 | 86.78 | 86.78 | 86.78 | 86.78 |
| BPADP | | % | 2 | 2 | 2 | 2 | 2 | 2 | 2 |
| TSAN | | % | 0.8 | 0.8 | 0.8 | 0.8 | 0.8 | 0.8 | 0.8 |
| Additives | | % | 0.46 | 0.46 | 0.46 | 0.46 | 0.46 | 0.46 | 0.46 |
| TOTAL | | % | 100 | 100 | 100 | 100 | 100 | 100 | 100 |
| Talc | | % | — | 20 | — | — | | | 10 |
| Clay | | % | — | — | 20 | — | | | 10 |
| $TiO_2$ | | % | — | — | — | 20 | | | — |
| Mica | | % | | | | | 16.7 | | |
| $BaSO_4$ | | % | | | | | | 16.7 | |
| MVR | | cc/10 min | 29 | 18 | 37 | 31 | 23 | 25 | 23 |
| MV | | Pa · s | 306 | 286 | 142 | 188 | 235 | 296 | 231 |
| Vicat | | ° C. | 135 | 136 | 130 | 133 | 136 | 136 | 135 |
| INI | Impact | kJ/m² | 7 | 6 | 4 | 6 | 6 | 7 | 5 |
| | Ductility | % | 0 | 0 | 0 | 0 | 0 | 0 | 0 |
| MAI | Impact | J | 94 | 73 | 1 | 81 | 21 | 66 | 12 |
| | Ductility | % | 100 | 0 | 0 | 60 | 0 | 0 | 0 |
| Tensile | Modulus | GPa | 2.5 | 5.1 | 4.0 | 2.9 | 4.1 | 2.8 | 4.5 |
| | Elongation | % | 57 | 5 | 2 | 21 | 7 | 74 | 3 |
| V0 | 1.6 mm | P/F | P | P | F | F | P | F | F |
| 5VB | 2 mm | P/F | F | P | P | F | P | F | P |
| Drip | 1.5 mm | D/ND/BD | D | ND | ND | ND | ND | D | ND |
| | 3 mm | D/ND/BD | BD | ND | ND | BD | BD | BD | ND |
| Smoke | 1.5 mm | Ds max - | 117 | 143 | 281 | 227 | | | 273 |
| | | VOF4 | 128 | 67 | 344 | 157 | | | 187 |
| | | SDI | 5.4 | 3.7 | 14.3 | 7.5 | | | 9.0 |
| Smoke | 3 mm | Ds max | 245 | 219 | 425 | 322 | 248 | 228 | 268 |
| | | VOF4 | 267 | 75 | 455 | 334 | 206 | 148 | 179 |
| | | SDI | 11.4 | 4.7 | 19.4 | 14.3 | 9.4 | 7.2 | 8.7 |

*Comparative Example

TABLE 5

|  |  | Units | 16* | 17* | 18* | 19 | 20 |
|---|---|---|---|---|---|---|---|
| PC-1 |  | % | 7.77 | 7.77 | 7.77 | 7.77 | 7.77 |
| PC-2 |  | % | 69.97 | 69.97 | 69.97 | 69.97 | 69.97 |
| PC-Si |  | % | 18 | 18 | 18 | 18 | 18 |
| SAN |  | % | 1 | 1 | 1 | 1 | 1 |
| BPADP |  | % | 2 | 2 | 2 | 2 | 2 |
| TSAN |  | % | 0.8 | 0.8 | 0.8 | 0.8 | 0.8 |
| Additives |  | % | 0.46 | 0.46 | 0.46 | 0.46 | 0.46 |
| TOTAL |  | % | 100 | 100 | 100 | 100 | 100 |
| Clay |  | % | 7.5 | 10 | 12.5 | 15 | 17.5 |
| MVR | 260° C./5 kg | cc/10 min | 18 | 18 | 17 | 16 | 14 |
| MV | 280° C./500 s$^{-1}$ | Pa·s | 483 | 469 | 445 | 408 | 404 |
| HDT | A/f | ° C. | 113 | 114 | 113 | 114 | 115 |
| INI | 23° C. | Impact kJ/m$^2$ | 43 | 26 | 14 | 12 | 11 |
|  |  | Ductility % | 100 | 80 | 0 | 0 | 0 |
| MAI | 23° C. | Impact J | 84 | 97 | 90 | 94 | 85 |
|  |  | Ductility % | 100 | 100 | 100 | 100 | 100 |
| Tensile | 5 mm/min | Modulus GPa | 2.7 | 2.9 | 2.9 | 3.2 | 3.3 |
|  |  | Elongation % | 89 | 90 | 83 | 72 | 35 |
| Drip | 3 mm | Dripping | BD | BD | BD | ND | ND |

*Comparative Example

The data in Table 5 shows that when clay is used as the reinforcing mineral filler, at least 15 wt. % is needed to prevent dripping at a thickness of 3 mm.

Examples 21-27

Examples 21-27 were formulated to show the effect of a siloxane-containing impact modifier, as well as free styrene-acrylonitrile (SAN), on the compositions. The formulations and results are shown in Table 6.

The results in Table 6 show that the presence of a siloxane-containing impact modifier, in particular a polycarbonate-polysiloxane copolymer improves the ductility of the compositions in a multi-axial impact test (compare Ex. 1 and Ex. 7 of Table 4 with Ex. 21 of Table 6).

The results in Table 6 also show that addition of very small quantities of SAN (less than 3 wt. % or less of the polymer component) does not adversely affect dripping (Ex. 21), and increases the viscosity of the composition. However, the addition of larger quantities (3-6 wt. % of the polymer component)

TABLE 6

|  |  | Units | 21* | 22 | 23 | 24 | 25 | 26 | 27 |
|---|---|---|---|---|---|---|---|---|---|
| PC-1 |  | % | 7.67 | 7.67 | 7.59 | 7.28 | — | — | — |
| PC-2 |  | % | 69.07 | 68.07 | 66.15 | 63.46 | — | — | — |
| PC-Si |  | % | 20 | 20 | 20 | 20 | 20 | 20 | 20 |
| SAN |  | % | — | 1 | 3 | 6 | — | — | — |
| ABS |  | % | — | — | — | — | — | — | 6 |
| BABS |  | % | — | — | — | — | 3.5 | 4 | — |
| BPADP |  | % | 2 | 2 | 2 | 2 | 2 | 2 | 2 |
| TSAN |  | % | 0.8 | 0.8 | 0.8 | 0.8 | 0.8 | 0.8 | 0.8 |
| Additives |  | % | 0.46 | 0.46 | 0.46 | 0.46 | 0.46 | 0.46 | 0.46 |
| TOTAL |  | % | 100 | 100 | 100 | 100 | 100 | 100 | 100 |
| Talc |  | % | 20 | 20 | 20 | 20 | 20 | 20 | 20 |
| Properties |  | Unit |  |  |  |  |  |  |  |
| MVR |  | cc/10 min | 12 | 16 | 14 | 14 | 14 | 14 | 9 |
| MV |  | Pa·s | 286 | 287 | 221 | 262 | 158 | 157 | 295 |
| Vicat |  | ° C. | 133 | 134 | 134 | 134 | 133 | 133 | 132 |
| INI | Impact | kJ/m$^2$ | 12 | 10 | 9 | 10 | 11 | 11 | 23 |
|  | Ductility | % | 0 | 0 | 0 | 0 | 0 | 0 | 0 |
| MAI | Impact | J | 77 | 60 | 77 | 78 | 51 | 59 | 52 |
|  | Ductility | % | 100 | 100 | 100 | 100 | 100 | 100 | 100 |
| Tensile | Modulus | GPa | 4.3 | 4.2 | 4.4 | 4.3 | 4.2 | 4.1 | 4.0 |
|  | Elongation | % | 7 | 7 | 6 | 7 | 7 | 7 | 8 |
| V0 | 1.6 mm | P/F | P | P | P | P | P | P | P |
| 5VB | 2 mm | P/F | P | P | P | P | P | P | P |
| Drip | 1.5 mm | D/ND/BD | ND | ND | — | — | ND | ND | ND |
|  | 3 mm | D/ND/BD | ND | ND | BD | BD | ND | ND | ND |
| Smoke | 1.5 mm | Ds max - | 191 |  | 203 | 211 |  |  |  |
|  |  | VOF4 | 79 |  | 90 | 84 |  |  |  |
|  |  | SDI | 4.5 |  | 5.0 | 4.9 |  |  |  |
| Smoke | 3 mm | Ds max | 229 | 301 | 266 | 371 | 244 | 357 | 279 |
|  |  | VOF4 | 68 | 79 | 63 | 83 | 82 | 72 | 72 |
|  |  | SDI | 4.5 | 5.6 | 4.8 | 6.5 | 5.2 | 6.0 | 5.2 |

*Comparative Example results in dripping (Exs. 22-23). In these particular formulations, the amount of free SAN thus should be below 6 wt. %, specifically below 3 wt. % to prevent dripping in 3 mm samples. The presence of ABS (Ex. 27) or bulk ABS (BABS, Exs. 25-26) does not increase dripping. The Examples with 3.5% BABS and 6% ABS each contain about 3 wt. % matrix SAN.

Examples 28-40

The effects of various impact modifiers and different flame retardants were determined in Examples 28-40. Formulations and properties are shown in Table 7.

TABLE 7

|  |  | Units | 28 | 29 | 30 | 31 | 32 | 33 | 34* | 35* | 36* | 37* | 38* | 39* | 40* |
|---|---|---|---|---|---|---|---|---|---|---|---|---|---|---|---|
| PC-1 |  | % | 80.54 | 91.04 | 90.54 | 85.54 | 82.04 | 90.54 | 85.54 | 88.54 | 86.04 | 86.04 | 90.54 | 70.54 | 75.54 |
| PC-Br |  | % | — | — | — | — | — | — | — | — | — | — | — | 20 | 20 |
| PC-Si |  | % | 10.5 | — | — | — | — | — | — | — | — | — | — | — | — |
| BABS |  | % | 3 | 3 | — | — | — | — | — | — | — | — | — | — | — |
| MBS |  | % | — | — | 3.5 | 3.5 | 7 | 3.5 | 3.5 | 3.5 | 3.5 | 3.5 | 3.5 | 3.5 | 3.5 |
| BPADP |  | % | 5 | 5 | 5 | 10 | 10 | — | — | 5 | 5 | 5 | 5 | 5 | — |
| RDP |  | % | — | — | — | — | — | 5 | 10 | — | — | — | — | — | — |
| TSAN |  | % | 0.5 | 0.5 | 0.5 | 0.5 | 0.5 | 0.5 | 0.5 | 2.5 | 5 | 5 | 0.5 | 0.5 | 0.5 |
| Additives |  | % | 0.46 | 0.46 | 0.46 | 0.46 | 0.46 | 0.46 | 0.46 | 0.46 | 0.46 | 0.46 | 0.46 | 0.46 | 0.46 |
| TOTAL |  | % | 100 | 100 | 100 | 100 | 100 | 100 | 100 | 100 | 100 | 100 | 100 | 100 | 100 |
| Talc |  | % | 20 | 20 | 20 | 20 | 20 | 20 | 20 | 20 | 20 | 0 | 13 | 20 | 20 |
| MVR |  | cc/10' | 8 | 9 | 6 | 11 | 11 | 8 | 16 | 3 | 1 | 5 | 8 | 6 | 3 |
| MV |  | Pa·s | 306 | 485 | 525 | 389 | 363 | 382 | 330 | 587 | 602 | 418 | 555 | 472 | 906 |
| HDT |  | °C. | 114 | 117 | 117 | 103 | 102 | 114 | 92 | 117 | 116 | 107 | 116 | 123 | 140 |
| INI | Impact | kJ/m$^2$ | 11 | 7 | 8 | 7 | 7 | 7 | 5 | 12 | 10 | 67 | 12 | 7 | 10 |
|  | Ductility | % | 0 | 0 | 0 | 0 | 0 | 0 | 0 | 0 | 0 | 100 | 0 | 0 | 0 |
| MAI | Impact | J | 82 | 97 | 103 | 34 | 61 | 87 | 19 | 107 | 110 | 131 | 106 | 98 | 105 |
|  | Ductility | % | 100 | 0 | 100 | 0 | 0 | 100 | 0 | 100 | 100 | 100 | 100 | 60 | 100 |
| Tensile | Modulus | GPa | 5.3 | 5.0 | 5.1 | 5.1 | 5.1 | 4.9 | 5.3 | 5.1 | 5.5 | 2.7 | 3.9 | 4.9 | 4.6 |
|  | Elongation | % | 6 | 7 | 6 | 6 | 6 | 6 | 5 | 6 | 7 | 102 | 70 | 7 | 10 |
| Smoke | 2 mm | Ds max | 316 |  | 153 |  |  |  |  |  |  | 357 |  |  |  |
|  |  | VOF4 | 69 |  | 263 |  |  |  |  |  |  | 734 |  |  |  |
|  |  | S.I. | 5.5 |  | 10.1 |  |  |  |  |  |  | 28.0 |  |  |  |
|  | 4 mm | Ds max | 284 | 241 | 308 | 260 | 351 | 296 | 480 | 301 | 377 | 417 | 347 | 618 | 518 |
|  |  | VOF4 | 114 | 117 | 133 | 126 | 166 | 161 | 204 | 215 | 247 | 604 | 321 | 157 | 349 |
|  |  | S.I. | 6.4 | 6.3 | 7.5 | 6.8 | 9.0 | 8.3 | 11.6 | 10.2 | 12.0 | 24.3 | 14.2 | 11.4 | 16.8 |
|  | 6 mm | Ds max |  | 243 | 285 |  |  |  |  |  |  | 568 |  |  |  |
|  |  | VOF4 |  | 53 | 66 |  |  |  |  |  |  | 556 |  |  |  |
|  |  | S.I. |  | 4.2 | 5.0 |  |  |  |  |  |  | 24.2 |  |  |  |
| Drip | 2 mm | D/ND/BD | ND |  | ND |  |  |  |  |  |  | BD |  |  |  |
|  | 4 mm | D/ND/BD | ND | ND | ND | ND | ND | ND | BD | D | BD | BD | D | ND | ND |
|  | 6 mm | D/ND/BD |  | ND | ND |  |  |  |  |  |  | BD |  |  |  |
| M-test | 2 mm | Q | 4.5 |  | 0 |  |  |  |  |  |  | 0 |  |  |  |
|  |  | M-rating** | M2 |  | M1 |  |  |  |  |  |  | M4 |  |  |  |
|  | 4 mm | Q | 4.3 | 0 | 3.2 | 0 | 3.5 | 4.2 | 2.7 | 0 | 0 | 0 | 0 | 3.8 | 7.0 |
|  |  | M-rating** | M2 | M1 | M2 | M1 | M2 | M2 | M4 | M1 | M1 | M4 | M1 | M2 | M2 |
|  | 6 mm | Q |  | 0 | 3.8 |  |  |  |  |  |  | 0 |  |  |  |
|  |  | M-rating** |  | M1 | M2 |  |  |  |  |  |  | M4 |  |  |  |

(*Comparative Examples)

It is clear from Example 37 (which has no reinforcing mineral filler) that such fillers are critical for achieving the selected M1/F1 rating, since this example has high smoke density, drip, and M4 rating. In fact, even a small reduction in the amount of reinforcing mineral filler, to 13 wt. % (Ex. 38), results in a sample having higher smoke emission, although an M1 rating is obtained.

The data in Table 7 show that increasing the relative amount of fluorinated polymer (TSAN) from 0.5 to 2.5% or 5 wt. % increases, rather than prevents, dripping in the drip test (compare, e.g., Ex. 30 (no drip at 2, 4, and 6 mm) with Exs. 35-37 (drip or burning drip at various thicknesses)). Even so, the increase in the amount of PTFE does help attain an M1 rating (compare Ex. 38 with Exs. 35 and 36). It is further known that use of an excess amount of a fluorinated polymer such as TSAN can lead to poorer thermoforming Without being bound by theory, it is believed that that fact that PTFE is difficult to disperse may lead to inhomogeneities in the sheet, which become more visible after thermoforming. It is also possible that the fibrous network formed by the PTFE contracts when the sheet is heated, again giving rise to an inhomogeneous polymer distribution in the sheet or even to the formation of holes.

The Examples in Table 7 further illustrate the difficulty in obtaining a balance of good ductility, no drips, and low smoke. Example 29 has excellent flame retardance, and an M1 rating in combination with low smoke at thicknesses of up to 6 mm. However, the composition is brittle, having 0% ductility in both Izod notched impact and multi-axial impact tests. Addition of a polycarbonate-polysiloxane copolymer as an impact modifier as in Example 28 improves ductility in the multi-axial impact test, but the M1 rating is lost and smoke density increases. Similarly, replacement of bulk ABS with MBS as in Example 28 improves ductility in the multi-axial impact test, but the M1 rating is lost and smoke density increases. The M1 rating is regained if the amount of aromatic diphosphate flame retardant is increased (Ex. 31), but once again, ductility in the multi-axial impact test is lost. Again, Examples 35, 36 and 38 illustrate that increasing the amount of TSAN in compositions containing MBS allows the compositions to be 100% ductile in the multi-axial impact test, and achieve an M1 rating, but the compositions fail the drip test.

While brominated organic compounds are known to improve flame retardancy generally, use of a brominated polycarbonate in the instant compositions increases the smoke emission and Q-value, rather than reducing them (compare Exs. 30-31 with Exs. 39-40). It is surprising that the Q-value is increased, since it is known that brominated PC can effectively be used to improve flame retardance when measured according to the UL94 standard.

RDP is also not as effective a flame retardant as BPADP, as it gives higher smoke density, higher Q-value, and more chance of dripping. This result is unexpected, as RDP has a higher phosphorus content, and therefore would have been expected to be more effective. It has been shown that RDP is more effective as a flame retardant when flame retardancy is determined in accordance with the UL94 standard. The fact that both brominated polycarbonate and RDP are much less effective than BPAPD in the M-test again shows there is no correlation between this test method and the more commonly used UL94 standards, where both are very effective FR additives.

Examples 28 and 41-47

These Examples were formulated to show the effect of various impact modifiers (bulk ABS (BABS), silicone oil, and polycarbonate-polysiloxane copolymer (PC-Si)) on the compositions. Results are shown in Table 8.

TABLE 8

|  |  | Units | 41 | 42 | 43 | 44 | 45 | 28 | 46 | 47 |
|---|---|---|---|---|---|---|---|---|---|---|
| PC-1 |  | % | 91.04 | 91.04 | 91.04 | 89.04 | 87.04 | 80.54 | 90.54 | 90.04 |
| BABS |  | % | 3 | 3 | 3 | 5 | 7 | 3 | 3 | 3 |
| PC-Si |  | % | — | — | — | — | — | 10.5 | — | — |
| Silicone oil |  | % | — | — | — | — | — | — | 0.5 | 1.0 |
| BPADP |  | % | 5 | 5 | 5 | 5 | 5 | 5 | 5 | 5 |
| TSAN |  | % | 0.5 | 0.5 | 0.5 | 0.5 | 0.5 | 0.5 | 0.5 | 0.5 |
| Additives |  | % | 0.46 | 0.46 | 0.46 | 0.46 | 0.46 | 0.46 | 0.46 | 0.46 |
| TOTAL |  | % | 100 | 100 | 100 | 100 | 100 | 100 | 100 | 100 |
| Fine Talc |  | % | 20 | 18 | 16 | 20 | 20 | 20 | 20 | 20 |
| MVR |  | Cc/10 min | 8.6 | 8.9 | 9.1 | 8.4 | 8.5 | 8 | 9.7 | 9.8 |
| MV |  | Pa·s | 557 | 521 | 520 | 452 | 463 | 306 | 460 | 417 |
| HDT |  | °C. | 119 | 118 | 117 | 118 | 117 | 114 | 118 | 118 |
| INI | Impact | kJ/m² | 7 | 7 | 9 | 7 | 7 | 11 | 12 | 14 |
|  | Ductility | % | 0 | 0 | 0 | 0 | 0 | 0 | 0 | 0 |
| MAI | Impact | J | 23 | 29 | 94 | 35 | 39 | 82 | 100 | 107 |
|  | Ductility | % | 0 | 0 | 100 | 0 | 0 | 100 | 100 | 100 |
| Tensile | Modulus | GPa | 5.5 | 5.2 | 4.8 | 5.5 | 5.4 | 5.3 | 5.4 | 5.6 |
|  | Elongation | % | 5 | 6 | 10 | 6 | 6 | 6 | 8 | 7 |
| Drip | 1.5 mm | D/ND/BD | ND | ND | ND | ND | ND | ND | ND | ND |
|  | 3 mm | D/ND/BD | ND | ND | ND | ND | ND | ND | ND | ND |
| Smoke | 1.5 mm | Ds max | 186 | 187 | 190 | 177 | 1829 | 227 | 213 | 210 |
|  |  | VOF4 | 219 | 267 | 213 | 222 | 271 | 122 | 212 | 173 |
|  |  | S.I. | 9.2 | 11.5 | 9.0 | 9.2 | 10.9 | 6.4 | 8.9 | 7.9 |
|  | 3 mm | Ds max | 237 | 218 | 249 | 262 | 227 | — | 216 | 201 |
|  |  | VOF4 | 129 | 138 | 238 | 123 | 162 | — | 132 | 78 |
|  |  | S.I. | 6.7 | 6.8 | 10.4 | 6.8 | 7.7 | — | 6.6 | 4.6 |

Table 8 shows that impact can be improved by reducing filler level, but at the cost of increased smoke density (Ex. 41 vs. Exs. 42-43). Increasing the amount of BABS only slightly increases impact, while leading to an increase in smoke density (Ex. 41 vs. Exs. 44-45). The most effective way to improve ductility is by using silicone oil, which improves impact and reduces smoke density (Ex. 41 vs. Exs. 46-47). When the siloxane is incorporated into a polycarbonate backbone (such as in a polycarbonate-polysiloxane copolymer), even around 2 wt. % siloxane does not yield as good an improvement in ductility (Ex. 28), nor does it give an M1 rating as does the silicone oil (see Table 8).

The amount of matrix SAN from, e.g., BABS, can be higher than the amount free SAN (Ex. 45, where 7 wt. % BABS=6 wt. % matrix SAN).

Examples 28-29 and 48-52

These Examples were formulated to show the effect of varying silicone oil, filler amount and type and loading of PTFE on the properties of the compositions. Results are shown in Table 9.

TABLE 9

| | | Units | 29 | 28 | 48 | 49 | 50 | 51 | 52 |
|---|---|---|---|---|---|---|---|---|---|
| PC-1 | | % | 91.04 | 80.54 | 90.59 | 90.34 | 90.09 | 90.715 | 93.59 |
| BABS | | % | 3 | 3 | 3 | 3 | 3 | 3 | — |
| PC-Si | | | — | 10.5 | — | — | — | — | — |
| Silicone oil | | % | — | — | 0.75 | 0.75 | 0.75 | 0.75 | 0.75 |
| BPADP | | % | 5 | 5 | 5 | 5 | 5 | 5 | 5 |
| TSAN | | % | 0.5 | 0.5 | 0.5 | 0.75 | 1 | — | — |
| Co-PTFE | | % | — | — | — | — | — | 0.375 | 0.5 |
| Additives | | % | 0.46 | 0.46 | 0.16 | 0.16 | 0.16 | 0.16 | 0.16 |
| TOTAL | | % | 100 | 100 | 100 | 100 | 100 | 100 | 100 |
| Fine Talc | | % | 20 | 20 | 18 | 18 | 18 | 18 | 18 |
| MVR | | cc/10' | 9.0 | 8.4 | 9.5 | 8.9 | 7.9 | 8.3 | 5.5 |
| MV | | Pa · s | 485 | 306 | 541 | 519 | 560 | 555 | 559 |
| HDT | | °C. | 117 | 114 | 112 | 113 | 113 | 115 | 117 |
| INI | Impact | kJ/m² | 7 | 11 | 16 | 16 | 15 | 18 | 24 |
| | Ductility | % | 0 | 0 | 0 | 0 | 0 | 0 | 0 |
| MAI (23° C.) | Impact | J | 97 | 82 | 86 | 102 | 118 | 115 | 89 |
| | Ductility | % | 0 | 100 | 100 | 100 | 100 | 100 | 100 |
| MAI (0° C.) | Impact | J | | | 96 | 90 | 89 | 104 | 86 |
| | Ductility | % | | | 100 | 60 | 60 | 100 | 100 |
| Tensile | Modulus | GPa | 5.0 | 5.3 | 5.0 | 5.0 | 5.1 | 4.9 | 4.7 |
| | Elongation | % | 7 | 6 | 28 | 11 | 8 | 33 | 68 |
| V0 | 1.6 mm | P/F | | P | P | P | P | P | P |
| 5VB | 2 mm | P/F | | P | P | P | P | P | P |
| Surface aesthetics | | | | | — | — | — | — | + |
| Thermoforming | | | | | 0 | — | — | — | + |
| Smoke | 1 mm | Ds max | | | | 191 | 227 | | |
| | | VOF4 | | | | 142 | 86 | | |
| | | S.I. | | | | 6.7 | 5.1 | | |
| | 1.5 mm | Ds max | 188 | 227 | 162 | 229 | 168 | 183 | |
| | | VOF4 | 287 | 122 | 200 | 159 | 158 | 97 | |
| | | S.I. | 11.4 | 6.4 | 8.3 | 7.6 | 7.0 | 5.1 | |
| | 2 mm | Ds max | | 186 | | | | | |
| | | VOF4 | | 149 | | | | | |
| | | S.I. | | 6.8 | | | | | |
| | | ITC | | 17.9 | | | | | |
| | | | | F1 | | | | | |
| | 3 mm | Ds max | | | 166 | 219 | 287 | 241 | |
| | | VOF4 | | | 122 | 92 | 119 | 90 | |
| | | S.I. | | | 5.7 | 5.3 | 6.8 | 5.4 | |
| | 4 mm | Ds max | 241 | 284 | 229 | 342 | 355 | 276 | |
| | | VOF4 | 117 | 114 | 32 | 38 | 33 | 42 | |
| | | S.I. | 6.3 | 6.4 | 3.4 | 4.7 | 4.7 | 4.2 | |
| | 6 mm | Ds max | 243 | | 253 | 297 | 267 | | |
| | | VOF4 | 53 | | 61 | 47 | 60 | | |
| | | S.I. | 4.2 | | 4.5 | 4.6 | 4.7 | | |
| Drip | 1 mm | D/ND/BD | | | | ND | ND | | |
| | 1.5 mm | D/ND/BD | ND | ND | ND | ND | ND | ND | ND |
| | 2 mm | D/ND/BD | | ND | | | | | |
| | 3 mm | D/ND/BD | ND | ND | ND | ND | ND | ND | ND |
| | 4 mm | D/ND/BD | ND | ND | ND | ND | ND | ND | |
| | 6 mm | D/ND/BD | ND | | ND | ND | ND | | |
| M-test | 1 mm | Q | | | | 0 | 0 | | |
| | | M-rating** | | | | M1 | M1 | | |
| | 2 mm | Q | | 4.5 | | | | | |
| | | M-rating** | | M2 | | | | | |
| | 4 mm | Q | 0 | 4.3 | 3.1 | 1.9 | 0 | 0 | |
| | | M-rating** | M1 | M2 | M2 | M1 | M1 | M1 | |
| | 6 mm | Q | 0 | | 3.8 | 2.9 | 3.0 | | |
| | | M-rating** | M1 | | M2 | M2 | M2 | | |

Table 9 shows it is possible to obtain an M1 rating in combination with low smoke for ductile samples over the entire range of thicknesses from 1 to 4 mm by using silicone oil as an impact modifier and 18 wt. % talc (Exs. 28-29 vs. Exs. 48-52) and a minimum level of PTFE. In comparison to Example 29, the examples with silicone oil have much more robust low smoke performance at lower thickness, as is also the case for polycarbonate-polysiloxane (PC-Si) (Ex. 28). Example 28 further has an F1 rating based on the combined low smoke density and smoke toxicity. However, when using polycarbonate-polysiloxane, much more siloxane (2 wt. %) is needed to obtain ductility, resulting in more smoke emission and higher Q-value. Even at such high siloxane loading, Izod notched impact and multi-axial impact are still lower than when 0.75% of silicone oil is used.

Use of higher amounts of TSAN (Exs. 49-50) allow the samples to achieve an M1 rating when silicone oil is used. Further, use of a PTFE-terpolymer additive including 70 wt. % of PTFE and 30 wt. % of a terpolymer provides the best impact performance and, importantly, surface aesthetics. It is also more effective in obtaining an M1 rating than TSAN, since 0.375 wt. % PTFE (Ex. 51) prevents ignition, while 0.75 wt. % TSAN, containing an equivalent amount of PTFE (Ex. 49) does not. These examples also show that the minimum level of PTFE to obtain M1 rating at 4 mm is about 0.35 wt. % (Ex. 51).

Examples 7 and 53-68

These Examples were formulated to show the effect of varying the amount of polycarbonate-polysiloxane, silicone oil, and aromatic diphosphate flame retardant on the composition's properties. Results are shown in Table 10.

The data in Table 10 show that all of the examples demonstrate no dripping and low smoke emission. An increase in the amount of polycarbonate-polysiloxane results in an increase in smoke density, (Ex. 55 vs. Exs. 56-57), whereas use of silicone oil tends to decrease smoke density (Table 9).

TABLE 10

| | | Units | 53 | 54 | 7 | 55 | 56 | 57 | 58 | 59 | 60 | 61 |
|---|---|---|---|---|---|---|---|---|---|---|---|---|
| PC-1 | | % | 9.87 | 8.10 | 9.67 | 8.93 | 7.67 | 4.81 | 8.27 | 8.07 | 9.87 | 9.67 |
| PC-2 | | % | 88.87 | 70.64 | 87.07 | 77.81 | 69.07 | 41.93 | 76.47 | 74.67 | 88.87 | 87.07 |
| PC-Si | | % | — | 20 | — | 10 | 20 | 50 | 10 | 10 | — | — |
| MBS | | % | — | — | — | — | — | — | 2 | 4 | — | — |
| BPADP | | % | — | — | 2 | 2 | 2 | 2 | 2 | 2 | — | 2 |
| TSAN | | % | 0.8 | 0.8 | 0.8 | 0.8 | 0.8 | 0.8 | 0.8 | 0.8 | 0.8 | 0.8 |
| Additives | | % | 0.46 | 0.46 | 0.46 | 0.46 | 0.46 | 0.46 | 0.46 | 0.46 | 0.46 | 0.46 |
| TOTAL | | % | 100 | 100 | 100 | 100 | 100 | 100 | 100 | 100 | 100 | 100 |
| Fine Talc | | % | 20 | 20 | 20 | 20 | 20 | 20 | 20 | 20 | 20 | 20 |
| MVR | | cc/10' | 16 | 11 | 18 | 16 | 12 | 8 | 12 | 11 | 16 | 18 |
| MV | | Pa·s | 241 | 323 | 286 | 313 | 295 | 246 | 278 | 384 | 241 | 286 |
| Vicat | | °C. | 142 | 142 | 136 | 135 | 133 | 132 | 134 | 133 | 142 | 136 |
| INI | Impact | kJ/m$^2$ | 7 | 22 | 6 | 9 | 12 | 44 | 12 | 16 | 7 | 6 |
| | Ductility | % | 0 | 100 | 0 | 0 | 0 | 100 | 0 | 0 | 0 | 0 |
| MAI | Impact | J | 79 | 77 | 73 | 85 | 77 | 36 | 86 | 89 | 79 | 73 |
| | Ductility | % | 80 | 100 | 20 | 100 | 100 | 100 | 100 | 100 | 80 | 20 |
| Tensile | Modulus | GPa | 4.8 | 3.9 | 5.1 | 4.5 | 4.3 | 3.6 | 4.8 | 4.6 | 4.8 | 5.1 |
| | Elongation | % | 4 | 8 | 5 | 6 | 7 | 5 | 7 | 7 | 4 | 5 |
| V0 | 1.6 mm | P/F | P | P | P | P | P | P | P | P | P | P |
| 5VB | 2 mm | P/F | P | P | P | P | P | P | P | P | P | P |
| CSTB | 1.5 mm | D/ND/BD | ND | — | ND | — | ND | — | ND | ND | ND | ND |
| | 3 mm | D/ND/BD | ND | ND | ND | ND | ND | ND | ND | ND | ND | ND |
| Smoke | 1.5 mm | Ds max | 139 | 180 | 143 | 218 | 191 | 196 | 185 | 199 | 139 | 143 |
| | | VOF4 | 94 | 114 | 67 | 69 | 79 | 124 | 40 | 66 | 94 | 67 |
| | | S.I. | 4.5 | 5.6 | 3.7 | 4.5 | 4.5 | 6.1 | 3.2 | 4.2 | 4.5 | 3.7 |
| | 3 mm | Ds max | 180 | — | 219 | 256 | 229 | 308 | 224 | 240 | 180 | 219 |
| | | VOF4 | 94 | — | 75 | 32 | 68 | 115 | 26 | 43 | 94 | 75 |
| | | S.I. | 4.9 | — | 4.7 | 3.6 | 4.5 | 6.9 | 3.1 | 3.8 | 4.9 | 4.7 |

| | | Units | 62 | 63 | 64 | 65 | 66 | 67 | 68 |
|---|---|---|---|---|---|---|---|---|---|
| PC-1 | | % | 8.10 | 7.67 | 7.7 | 7.28 | 8.07 | 7.47 | 6.87 |
| PC-2 | | % | 70.64 | 69.07 | 67.1 | 63.46 | 74.67 | 72.27 | 69.871 |
| PC-Si | | % | 20 | 20 | 20 | 20 | 10 | 10 | 10 |
| MBS | | % | — | — | — | — | 4 | 4 | 4 |
| BPADP | | % | — | 2 | 4 | 8 | 2 | 5 | 8 |
| TSAN | | % | 0.8 | 0.8 | 0.8 | 0.8 | 0.8 | 0.8 | 0.8 |
| Additives | | % | 0.46 | 0.46 | 0.46 | 0.46 | 0.46 | 0.46 | 0.46 |
| TOTAL | | % | 100 | 100 | 100 | 100 | 100 | 100 | 100 |
| Fine Talc | | % | 20 | 20 | 20 | 20 | 20 | 20 | 20 |
| MVR | | cc/10' | 11 | 12 | 16 | 24 | 11 | 14 | 17 |
| MV | | Pa·s | 323 | 295 | 210 | 163 | 384 | 308 | 252 |
| Vicat | | °C. | 142 | 133 | 129 | 118 | 133 | 125 | 116 |
| INI | Impact | kJ/m$^2$ | 22 | 12 | 9 | 7 | 16 | 11 | 8 |
| | Ductility | % | 100 | 0 | 0 | 0 | 100 | 0 | 0 |
| MAI | Impact | J | 77 | 77 | 80 | 55 | 89 | 95 | 95 |
| | Ductility | % | 100 | 100 | 100 | 60 | 100 | 100 | 100 |
| Tensile | Modulus | GPa | 3.9 | 4.3 | 4.4 | 4.8 | 4.6 | 4.7 | 5.1 |
| | Elongation | % | 8 | 7 | 7 | 5 | 7 | 7 | 6 |
| V0 | 1.6 mm | P/F | P | P | P | P | P | P | P |
| 5VB | 2 mm | P/F | P | P | P | P | P | P | P |
| CSTB | 1.5 mm | D/ND/BD | — | ND | ND | — | ND | ND | ND |
| | 3 mm | D/ND/BD | ND | ND | ND | ND | ND | ND | ND |
| Smoke | 1.5 mm | Ds max | 180 | 191 | 175 | 212 | 199 | 234 | 237 |
| | | VOF4 | 114 | 79 | 83 | 79 | 66 | 78 | 64 |
| | | S.I. | 5.6 | 4.5 | 4.5 | 4.7 | 4.2 | 4.9 | 4.5 |
| | 3 mm | Ds max | 281 | 229 | 275 | — | 240 | 292 | 368 |
| | | VOF4 | 31 | 68 | 22 | — | 43 | 44 | 59 |
| | | S.I. | 3.8 | 4.5 | 3.5 | — | 3.8 | 4.4 | 5.7 |

Examples 53-54, 58, and 62 all exhibit no drip, and have no brominated polycarbonate resin (e.g., PC-BR). These examples demonstrate that composition with no brominated polycarbonate resin (e.g., no PC-BR) can be formulated to have no drips.

Increased levels of MBS result in more smoke (Ex. 58 vs. Exs. 65-66), likely due to the presence of the high loading of butadiene in the MBS. Varying the amounts of BPADP can increase or decrease smoke density, depending on the impact modifier/BPADP ratio already present.

Examples 48-51 and 69

These Examples show the effect of the fluoropolymer on the properties of the compositions, in particular the processability of the composition and the surface characteristics of articles processed from the compositions. The formulations for Examples 48-51 are shown in Table 12. Example 69 is a comparative, commercially available, flame retardant, impact modified polycarbonate composition (formulation not shown).

The samples were extruded and formed into sheets. The material for each composition was first dried at 100° C. for 4 hours. The composition was then processed through the extruder in accordance with the parameters shown in Table 11. When the extruder temperatures had reached their set points, the material was loaded into a hopper and fed through the extruder until the extruder and die were purged (i.e., until no visible defects were noticeable in the extrudate). The material was then fed through the extruder and formed into sheets (39×100 cm, at 1.0, 2.0, 3.0 and 4.0 mm thick).

TABLE 11

|          |        | Temperature (° C.) |
|----------|--------|--------------------|
| Extruder | Zone 1 | 220 |
|          | Zone 2 | 230 |
|          | Zone 3 | 240 |
|          | Zone 4 | 250 |
|          | Zone 5 | 260 |
| Die      | Zone 1 | 250 |
|          | Zone 2 | 270 |
|          | Zone 3 | 265 |
|          | Zone 4 | 270 |
| Rolls    | Roll 1 | 85 |
|          | Roll 2 | 115 |
|          | Roll 3 | 125 |

The compositions of Examples 48-51 and testing results are shown in Table 12. In Table 12, "extrusion" means that the property was tested in the extrusion direction, and "web" means that the property was tested perpendicular to the extrusion direction.

TABLE 12

| | Units | 48 | | 49 | | 50 | | 51 | |
|---|---|---|---|---|---|---|---|---|---|
| PC-1 | % | 90.59 | | 90.34 | | 90.09 | | 90.715 | |
| BABS | % | 3 | | 3 | | 3 | | 3 | |
| Silicone oil | % | 0.75 | | 0.75 | | 0.75 | | 0.75 | |
| BPADP | % | 5 | | 5 | | 5 | | 5 | |
| TSAN | % | 0.5 | | 0.75 | | 1 | | — | |
| Co-PTFE | % | — | | — | | — | | 0.375 | |
| Additives | % | 0.16 | | 0.16 | | 0.16 | | 0.16 | |
| TOTAL | % | 100 | | 100 | | 100 | | 100 | |
| Fine Talc | % | 18 | | 18 | | 18 | | 18 | |

| Properties | | Units | Av | St | Av | St | Av | St | Av | St |
|---|---|---|---|---|---|---|---|---|---|---|
| MAI, 23° C. | Max Force | N | 7799 | 1120 | 9497 | 713 | 9423 | 1109 | 11149 | 872 |
| MAI, −20° C. | Max Force | N | 6557 | 1448 | 4423 | 1157 | 5294 | 1832 | 7724 | 1213 |
| MAI, 23° C. | Energy at Break | J | 69.6 | 24.1 | 96.3 | 9.5 | 90.6 | 21 | 125.8 | 18.8 |
| MAI, −20° C. | Energy at Break | J | 25.4 | 8.3 | 12.1 | 6.2 | 16.6 | 9 | 32.9 | 6.3 |
| MAI, 23° C. | Ductility | | Ductile support crack | | Ductile support crack | | Ductile support crack | | Ductile | |
| MAI, −20° C. | Ductility | | Brittle (80%) | | Brittle | | Brittle | | Brittle (60%) | |
| INI, 23° C. (extrusion) | Impact | kJ/m$^2$ | 14.87 | 3.15 | 12.63 | 0.50 | 12.97 | 0.90 | 21.57 | 0.84 |
| INI, −20° C. (extrusion) | Impact | kJ/m$^2$ | 13.03 | 0.76 | 13.38 | 1.50 | 12.97 | 0.90 | 16.51 | 2.57 |
| INI, 23° C. (web) | Impact | kJ/m$^2$ | 13.81 | 0.74 | 10.89 | 3.49 | 12.44 | 0.55 | 18.48 | 5.84 |
| INI −20° C. (web) | Impact | kJ/m$^2$ | 15.13 | 1.34 | 13.03 | 4.05 | 12.80 | 4.11 | 15.30 | 4.36 |
| Tensile modulus (extrusion) | | MPa | — | | — | | 12.08 | 3.87 | 4761 | 76 |
| Elongation at Break (extrusion) | | % | — | | — | | 13.0 | 5.2 | 35.7 | 12.9 |
| Tensile modulus (web) | | MPa | — | | — | | 4712 | 124 | 4520 | 68 |
| Elongation at Break (web) | | % | — | | — | | 6.2 | 1.6 | 14.0 | 5.8 |
| E Modulus (extrusion) | | N/mm$^2$ | — | | — | | 4248 | 4917 | 4261 | 57.72 |
| E Modulus (web) | | N/mm$^2$ | — | | — | | 3946 | 170.82 | 3914 | 152.5 |

As shown in Table 12, the compositions have a good balance between impact strength and stiffness. Example 51 has improved stiffness (elastic modulus (extrusion)=4261 MPa) relative to a commercially available, flame retardant, impact modified polycarbonate composition (Ex. 69, which has an elastic modulus of 3660 MPa). The sheet made from Example 51 further has improved Izod notched impact strength at 23° C. measured in both directions relative to the Izod notched impact strength of the sheets made from Examples 48-50. Examples 48-51 were further found to have improved chemical resistance compared with standard polycarbonate and some commercially available polycarbonate/ABS blends (data not shown).

The sheets produced from Example 48 have very robust flame retardant properties. However, the sheet produced from Example 51, which contains a PTFE-terpolymer composition (co-PTFE), has the best overall performance, achieving a good balance of mechanical properties (including improved impact and ductility relative to Exs. 48-50, with TSAN) and an M1/F1 rating. In a particularly advantageous feature, the M1/F1 rating is attained over a broad range of thicknesses, from 1.0 to 4.0 mm. A comparison between the M-test results of Example 69 and Example 51 is shown in Table 13. The F-test results are expected to be F-1 for Example 1 at thicknesses of 1.0, 2.0, 3.0, and 4.0 mm.

TABLE 13

| Test | Thickness | Ex. 69* | Ex. 51 |
| --- | --- | --- | --- |
| M-Test | 1.0 mm | — | M1 |
| | 2.0 | M1 | M1 |
| | 3.0 | M2 | M1 |
| | 4.0 | M3 | M1 |

*Comparative Example

Processing results for Examples 69 and Examples 48-51 are shown in Table 14.

TABLE 14

| Ex. No. | RPM | Torque (%) | Pressure (bar) | Line speed (m/min) | Observations |
| --- | --- | --- | --- | --- | --- |
| 69* | 135 | 43 | 76 | 0.45 | — |
| 48 | 115 | — | 42 | 0.45 | Torque very low and not stable |
| 49 | 115 | 50 | 66 | 0.46 | — |
| 50 | 118 | 54 | 61 | 0.46 | Appearance of "beard growth" |
| 51 | 110 | 60 | 62 | 0.5 | Better processability, better surface |

*Comparative Example

The results in Table 14 show that Example 51 has excellent extrudability.

In addition, thermoformed sheets produced from the compositions of Example 51 have a smooth surface. The sheets of Examples 49 and 51 were thermoformed on a MEAF vacuum-forming machine, equipped with quartz lamps. The surface of the thermoformed sheet of Example 49 (containing TSAN) was not smooth, and has observable waviness and irregularities. The surface of a thermoformed sheet of Example 51 (containing a PTFE-terpolymer), in contrast, was smooth, with no observable irregularities.

Examples 70-73

These Examples were formulated to show the effect of varying loading of PTFE, using a higher molecular weight polycarbonate and the inclusion of colorants on the properties of the compositions. Results are shown in Table 15.

TABLE 15

| | | Units | 70 | 71 | 72 | 73 |
| --- | --- | --- | --- | --- | --- | --- |
| PC-1 | | % | 90.72 | 90.59 | 90.47 | |
| PC-3 | | % | | | | 90.47 |
| BABS | | % | 3 | 3 | 3 | 3 |
| Silicone oil | | % | 0.75 | 0.75 | 0.75 | 0.75 |
| BPADP | | % | 5 | 5 | 5 | 5 |
| Co-PTFE | | % | 0.375 | 0.5 | 0.625 | 0.625 |
| Additives | | % | 0.16 | 0.16 | 0.16 | 0.16 |
| TOTAL | | % | 100 | 100 | 100 | 100 |
| Fine Talc | | % | 20 | 20 | 20 | 20 |
| Colorants | | % | 1.37 | 1.37 | 1.37 | 1.37 |
| MVR | | cc/10' | 7.5 | 6.4 | 5.8 | 3.2 |
| MV | | Pa·s | 571 | 595 | 579 | 877 |
| Vicat | | °C. | 130.3 | 130.9 | 130.7 | 132.3 |
| HDT | | °C. | 114.2 | 115.7 | 115.4 | 116.2 |
| INI | Impact | kJ/m$^2$ | 22.6 | 28.4 | 29.7 | 57.4 |
| | Ductility | % | 100 | 100 | 100 | 100 |
| MAI (23° C.) | Impact | J | 105 | 125 | 119 | 128 |
| | Ductility | % | 100 | 100 | 100 | 100 |
| MAI (0° C.) | Impact | J | 93 | 102 | 95 | 104 |
| | Ductility | % | 100 | 100 | 100 | 100 |
| Tensile | Modulus | GPa | 4.8 | 4.8 | 4.8 | 4.7 |
| | Elongation | % | 47 | 32 | 42 | 110 |
| V0 | 1.2 mm | P/F | P | P | P | P |
| Smoke | 1.5 mm | Ds max | 210 | 181 | 164 | 154 |
| | | VOF4 | 258 | 226 | 214 | 180 |
| | | S.I. | 10.7 | 9.3 | 8.8 | 7.6 |
| Drip | 1 mm | D/ND/BD | | | | |
| | 1.5 mm | D/ND/BD | | | | |
| | 2 mm | D/ND/BD | | | | |
| | 3 mm | D/ND/BD | ND | ND | ND | ND |
| | 4 mm | D/ND/BD | | | | |
| M-test | 4 mm | Q | | 0 | | |
| | | M-rating** | | M1 | | |
| | 5 mm | Q | | 0 | | 0 |
| | | M-rating** | | M1 | | M1 |

Table 15 shows higher levels of PTFE result in robust low smoke performance Ex. 70 vs. Ex. 72). Example 73 further shows that higher molecular weight PC results in even better low smoke performance. Additionally, higher amounts of PTFE (Exs. 49-50) allow the samples to achieve an M1 rating when silicone oil is used. Finally, the use of colorants does not adversely affect these results.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the term "combination" is inclusive of blends, mixtures, alloys, reaction products, or the like.

An "organic group" as used herein means a saturated or unsaturated (including aromatic) hydrocarbon having a total of the indicated number of carbon atoms, which can be unsubstituted or unsubstituted with one or more of halogen, nitrogen, sulfur, or oxygen, provided that such substituents do not significantly adversely affect the selected properties of the thermoplastic polycarbonate composition, for example transparency, heat resistance, or the like. Exemplary substituents include, but are not limited to, $C_{1-12}$ alkyl, $C_{2-12}$ alkenyl, $C_{2-12}$ akynyl, $C_{1-12}$ cycloalkyl, $C_{6-12}$ aryl, $C_{7-12}$ alkylaryl, $C_{7-12}$ arylalkyl, —$NO_2$, —SH, —CN, —OH, halogen, $C_{1-12}$ alkoxy, $C_{6-12}$ aryloxy, $C_{1-12}$ acyl, $C_{1-12}$ alkoxy carbonyl, primary, secondary, and tertiary amines substituted having $C_{1-12}$ alkyl groups, an amide groups.

As used herein, the term "hydrocarbyl" refers broadly to a substituent including carbon and hydrogen, optionally with at least one heteroatom, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

While the disclosed embodiments have been described with reference to an exemplary embodiment, it will be understood by those skilled in the art that various changes can be made and equivalents can be substituted for elements thereof without departing from the scope of that disclosed. In addition, many modifications can be made to adapt a particular situation or material to the disclosure without departing from the essential scope thereof Therefore, it is intended that the disclosure not be limited to the particular embodiment disclosed as the best mode contemplated, but that the disclosed embodiments will include all embodiments falling within the scope of the appended claims.

What is claimed is:

1. A thermoplastic polycarbonate composition comprising, based on the total weight of the thermoplastic polycarbonate composition:
    (a) greater than 10 to less than 30 wt % of a reinforcing mineral filler, wherein the reinforcing mineral filler consists of talc; and
    (b) greater than 60 to less than 90 wt. % of a polymer component, comprising, based on the weight of the polymer component,
        68 to 99.9 wt. % of an aromatic polycarbonate,
        0.1 to 2 wt. % of a fluorinated polymer,
        0.1 to 5 wt. % of a silicone oil,
        optionally, 0.1 to 25 wt. % of an impact modifier; and
        optionally, 0.1 to 5 wt. % of an additive composition comprising an antioxidant, a mold release agent, and a stabilizer;
wherein a molded sample of the thermoplastic polycarbonate composition has no drips when measured in accordance with NF P 92-505 at a thickness of 1.5 mm,
a smoke density index of less than 10, determined in accordance with the formula:

$$SDI = (Ds\ max/100) + (VOF4/30)$$

wherein
    SDI is the smoke density index;
    Ds max is the maximum smoke density; and
    VOF4 is the average smoke density measured over the first four minutes, and is calculated in accordance with the formula:

$$\tfrac{1}{2}Ds0 + Ds1 + Ds2 + Ds3 + \tfrac{1}{2}Ds4;$$

wherein
    Ds0 is the smoke density at 0 minutes,
    Ds1 is the smoke density at 1 minute,
    Ds2 is the smoke density at 2 minutes,
    Ds3 is the smoke density at 3 minutes, and
    Ds4 is the smoke density at 4 minutes; and
Ds max, Ds0, Ds1, Ds2, Ds3, and Ds4 are measured in accordance with NF X 10-702 at a thickness of 3 mm, and
    100% ductility in a multi-axial impact test at 23° C., measured in accordance with ISO 6603.

2. The composition of claim 1, comprising from 15 to less than 30 wt. % of talc, wherein the composition has no drips at a thickness of 3 mm when measured in accordance with NF P 92-505.

3. The composition of claim 1, further comprising 1 to 8 wt. % of an organic, phosphorus-containing flame retardant.

4. The composition of claim 1, comprising from 1 to 25 wt. % of a polycarbonate-polysiloxane impact modifier, based on the total weight of the polymer component, wherein a molded sample of the composition has 100% ductility in a multi-axial impact test at 23° C., measured in accordance with ISO 6603.

5. The composition of claim 1, comprising less than 6 wt. % of free styrene-acrylonitrile, based on the total weight of the polymer component, wherein a molded sample of the composition has 100% ductility in a multi-axial impact test at 23° C., measured in accordance with ISO 6603.

6. The composition of claim 1, comprising 15 to 22 wt. % of talc as the reinforcing mineral filler, based on the total weight of the composition, wherein molded samples of the composition 4 mm in thickness have an M2 or M1 rating.

7. The composition of claim 6, further comprising 0.2 to 2 wt. % of a fluorinated polymer, based on the total weight of the polymer component, wherein a molded sample of the composition has 100% ductility in a multi-axial impact test at 23° C. and a thickness of 3.2 mm, an M1 rating at a thickness of 1 mm, and an F1 rating at a thickness of 4 mm.

8. The composition of claim 1, comprising 15 to 22 wt. % of talc; 88 to 95 wt. % of the polycarbonate; 0.1 to 5 wt. % of bulk acrylonitrile-butadiene styrene; 0.5 to 1.0 wt. % of silicone oil; no halogenated flame retardants; and 3 to 8 wt. % of an aromatic diphosphate flame retardant.

9. The composition of claim 8, wherein the fluorinated polymer is polytetrafluoroethylene associated with a thermoplastic, fluorinated polymer having a fluorinated backbone.

10. The composition of claim 1, comprising 0.25 to 2.0 wt % of silicone oil.

11. A method of forming the composition of claim 1, comprising combining the components of the composition thereof.

12. An article comprising the composition of claim 1.

13. A method for the manufacture of an article, comprising molding or extruding the composition of claim 1.

14. A thermoplastic polycarbonate composition comprising, based on the total weight of the thermoplastic polycarbonate composition,
(a) 15 to 22 wt. % of talc;
(b) less than 5 wt. % of clay; and
(c) 78 to 85 wt. % of a polymer component, comprising, based on the weight of the polymer component,
79 to 98.7 wt. % of a polycarbonate comprising units derived from bisphenol A;
0.1 to 2 wt. % of a fluorinated polymer;
1 to 8 wt. % of a phosphorus-containing flame retardant comprising units derived from bisphenol A;
0 to 5 wt. % of a bulk acrylonitrile-butadiene-styrene;
0.1 to 5 wt. % of a silicone oil; and
0.1 to 1 wt. % of an additive composition comprising an antioxidant, a mold release agent, and a stabilizer;
wherein a molded sample of the thermoplastic polycarbonate composition has
no drips when measured in accordance with NF P 92-505;
a smoke density index of less than 10 determined in accordance with the formula:

$$SDI=(Ds\ max/100)+(VOF4/30)$$

wherein
SDI is the smoke density index;
Ds max is the maximum smoke density; and
VOF4 is the average smoke density measured over the first four minutes, and is calculated in accordance with the formula:

$$\tfrac{1}{2}Ds0+Ds1+Ds2+Ds3+\tfrac{1}{2}Ds4;$$

wherein
Ds0 is the smoke density at 0 minutes,
Ds1 is the smoke density at 1 minute,
Ds2 is the smoke density at 2 minutes,
Ds3 is the smoke density at 3 minutes, and
Ds4 is the smoke density at 4 minutes; and
Ds max, Ds0, Ds1, Ds2, Ds3, and Ds4 are measured in accordance with NF X 10-702 at a thickness of 3 mm;
100% ductility in a multi-axial impact test at 23° C., measured in accordance with ISO 6603; and an M1 rating at a thickness of 4 mm.

15. The composition of claim 14, comprising 0.25 to 2.0 wt % of silicone oil.

16. A sheet, comprising:
a thermoplastic polycarbonate composition comprising, based on the total weight of the thermoplastic polycarbonate composition:
(a) greater than 10 to less than 30 wt. % of a reinforcing mineral filler, wherein the reinforcing mineral filler consists of talc;
(b) greater than 60 to less than 90 wt. % of a polymer component, comprising, based on the weight of the polymer component,
68 to 99.7 wt. % of an aromatic polycarbonate,
0.3 to 2 wt. % of a fluorinated polymer comprising a polytetrafluoroethylene associated with a thermoplastic, fluorinated polymer having a fluorinated backbone,
0.1 to 5.0 wt. % of a silicone oil,
optionally, 0.1 to 25 wt. % of an impact modifier; and
optionally, 0.1 to 5 wt. % of an additive composition comprising an antioxidant, a mold release agent, and a stabilizer;
wherein the sheet has
no drips when measure in accordance with NF P 92-505 at a thickness of 1.5 mm,
a smoke density index of less than 10 determined in accordance with the formula:

$$SDI=(Ds\ max/100)+(VOF4/30)$$

wherein
SDI is the smoke density index;
Ds max is the maximum smoke density; and
VOF4 is the average smoke density measured over the first four minutes, and is calculated in accordance with the formula:

$$\tfrac{1}{2}Ds0+Ds1+Ds2+Ds3+\tfrac{1}{2}Ds4;$$

wherein
Ds0 is the smoke density at 0 minutes,
Ds1 is the smoke density at 1 minute,
Ds2 is the smoke density at 2 minutes,
Ds3 is the smoke density at 3 minutes, and
Ds4 is the smoke density at 4 minutes; and
Ds max, Ds0, Ds1, Ds2, Ds3, and Ds4 are measured in accordance with NF X 10-702 at a thickness of 3 mm, and
an M1 rating and an F1 rating at a sheet thickness of 4 mm, and 100% ductility in a multi-axial impact test at 23° C., measured in accordance with ISO 6603.

17. The sheet of claim 16, wherein the sheet has a thickness of 1 mm to 6 mm.

18. The sheet of claim 16, comprising 0.25 to 2 wt. % of silicone oil, based on the total weight of the polymer component, wherein a 4 mm thick sheet has 100% ductility in a multi-axial impact test at 23° C., measured in accordance with ISO 6603.

19. The sheet of claim 16, wherein the fluoropolymer comprises 70 to 90 wt. % of the polytetrafluoroethylene and 10 to 30 wt. % of the thermoplastic, fluorinated polymers having a fluorinated backbone, based on the total weight of the fluorinated polymer.

20. The sheet of claim 16, in the form of an interior component for a hospital, school, train, or airplane, wherein the interior component is selected from the group consisting of a ceiling, wall, seating, seat trays, seat backs, cladding, and window surrounding.

21. A method of forming an article, comprising thermoforming the sheet of claim 16 to form the article.

22. The method of claim 21, wherein the article has surfaces that are free from surface irregularities as viewed by the unaided eye.

23. A sheet comprising, based on the total weight of the thermoplastic polycarbonate composition:
(a) greater than 10 to less than 30 wt. % of reinforcing mineral filler, wherein the reinforcing mineral filler consists of talc; and
(b) greater than 60 to less than 90 wt. % of a polymer component, comprising, based on the weight of the polymer component,
68 to 99.9 wt. % of an aromatic polycarbonate,
0.1 to 2 wt. % of a fluorinated polymer,
0.1 to 5 wt. % of a silicone oil,
optionally, 0.1 to 25 wt. % of an impact modifier; and
optionally, 0.1 to 5 wt. % of an additive composition comprising an antioxidant, a mold release agent, and a stabilizer;
wherein the sheet has
no drips when measured in accordance with NF P 92-505 at a thickness of 1.5 mm, and
a smoke density index of less than 10, determined in accordance with the formula:

$$SDI=(Ds\ max/100)+(VOF4/30)$$

wherein
- SDI is the smoke density index;
- Ds max is the maximum smoke density; and
- VOF4 is the average smoke density measured over the first four minutes, and is calculated in accordance with the formula:

$\frac{1}{2}Ds0+Ds1+Ds2+Ds3+\frac{1}{2}Ds4;$ wherein
- Ds0 is the smoke density at 0 minutes,
- Ds1 is the smoke density at 1 minute,
- Ds2 is the smoke density at 2 minutes,
- Ds3 is the smoke density at 3 minutes, and
- Ds4 is the smoke density at 4 minutes; and
- Ds max, Ds0, Ds1, Ds2, Ds3, and Ds4 are measured in accordance with NF X 10-702 at a thickness of 3 mm, and
- 100% ductility in a multi-axial impact test at 23° C., measured in accordance with ISO 6603.

24. The sheet of claim 23, wherein the fluorinated polymer comprises polytetrafluoroethylene associated with thermoplastic fluorinated polymers having a fluorinated backbone, based on the weight of the polymer component.

25. The sheet of claim 23, comprising 0.25 to 2.0 wt % of silicone oil.

* * * * *